(12) United States Patent
Jyumonji

(10) Patent No.: US 12,703,313 B2
(45) Date of Patent: Aug. 11, 2026

(54) ON-VEHICLE ELECTRIC POWER CONTROL SYSTEM, CONTROL DEVICE, AND AGGREGATED CONTROL DEVICE

(71) Applicant: HITACHI ASTEMO, LTD., Hitachinaka (JP)

(72) Inventor: Kentarou Jyumonji, Hitachinaka (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 0 days.

(21) Appl. No.: 19/112,719

(22) PCT Filed: Oct. 14, 2022

(86) PCT No.: PCT/JP2022/038374
§ 371 (c)(1),
(2) Date: Mar. 18, 2025

(87) PCT Pub. No.: WO2024/079884
PCT Pub. Date: Apr. 18, 2024

(65) Prior Publication Data
US 2026/0097728 A1 Apr. 9, 2026

(51) Int. Cl.
*B60R 16/03* (2006.01)
*H02J 1/082* (2026.01)

(52) U.S. Cl.
CPC .............. *B60R 16/03* (2013.01); *H02J 1/082* (2020.01)

(58) Field of Classification Search
CPC ................................ B60R 16/03; H02J 1/082
See application file for complete search history.

(56) References Cited

U.S. PATENT DOCUMENTS

2010/0254059 A1 10/2010 Higuchi et al.
2013/0181514 A1* 7/2013 Ikeda ..................... B60L 58/15 307/77

(Continued)

FOREIGN PATENT DOCUMENTS

JP 2009-130944 A 6/2009
JP 2015-166998 A 9/2015
JP 2020-036418 A 3/2020

OTHER PUBLICATIONS

International Search Report with English Translation and Written Opinion of International Application No. PCT/JP2022/038374 dated Dec. 6, 2022 (8 pages).

(Continued)

*Primary Examiner* — Jeffrey M Shin
(74) *Attorney, Agent, or Firm* — Foley & Lardner LLP

(57) ABSTRACT

The influence of a power supply voltage drop due to a wire diameter reduction of a wire harness is suppressed, and the operation guarantee voltages of components 501 to 503 connected to the wire harness are appropriately secured. An on-vehicle electric power control system 1 includes a low-voltage battery 50, a first control device 100, and components 501 to 503. The first control device 100 acquires wiring resistance values of power supply lines of a third power supply line 60, a fourth power supply line 80, and a fifth power supply line 90, acquires a current value supplied to the components 501 to 503, and calculates a voltage drop amount in the power supply line based on the acquired wiring resistance value and current value. Then, a correction value for correcting the output voltage of the DC-DC converter 30 is determined based on the calculated voltage drop amount, and a correction request indicating the determined correction value is transmitted to a second control device 200.

16 Claims, 18 Drawing Sheets

(56) References Cited

U.S. PATENT DOCUMENTS

2021/0184557 A1 6/2021 Nishibata
2025/0370490 A1* 12/2025 Andal ..................... B60R 16/03

OTHER PUBLICATIONS

Japanese Office Action issued in JP Application No. 2024-551027 dated Jan. 20, 2026 (13 Pages).

* cited by examiner

1
HV BATTERY
10
20
DC-DC CONVERTER
30
40
LV BATTERY
50
60
POWER DISTRIBUTOR
70
80
FIRST CONTROL DEVICE
100
90
COMPONENT
501
502
503
OUTPUT VOLTAGE
51
CORRECTION REQUEST
101
CHANGE INSTRUCTION
201
SECOND CONTROL DEVICE
200
210
211

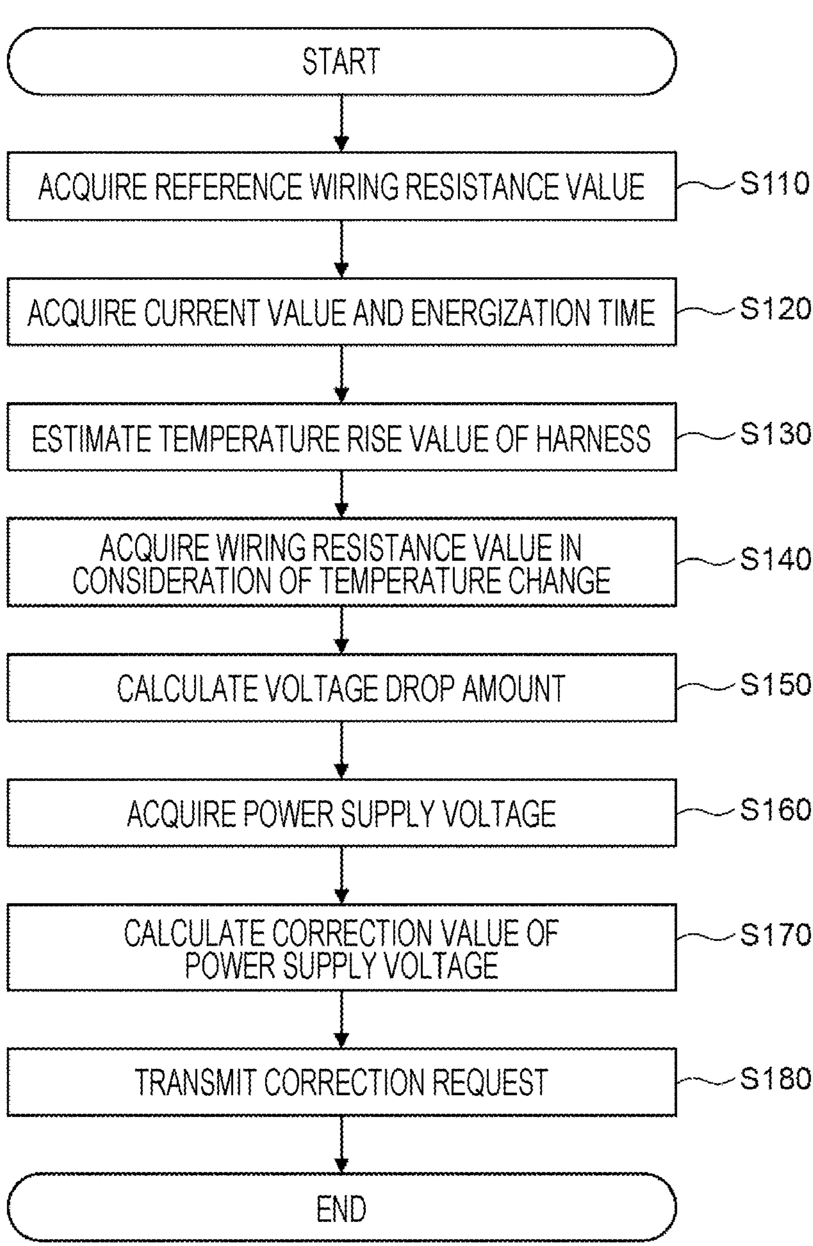
FIG. 1C
START
ACQUIRE REFERENCE WIRING RESISTANCE VALUE
S110
ACQUIRE CURRENT VALUE AND ENERGIZATION TIME
S120
ESTIMATE TEMPERATURE RISE VALUE OF HARNESS
S130
ACQUIRE WIRING RESISTANCE VALUE IN CONSIDERATION OF TEMPERATURE CHANGE
S140
CALCULATE VOLTAGE DROP AMOUNT
S150
ACQUIRE POWER SUPPLY VOLTAGE
S160
CALCULATE CORRECTION VALUE OF POWER SUPPLY VOLTAGE
S170
TRANSMIT CORRECTION REQUEST
S180
END

| DEVICE | STORED DATA OF CORRECTION VALUE REQUEST |
| --- | --- |
| FIRST CONTROL DEVICE 100A | 14.5V |
| FIRST CONTROL DEVICE 100B | 14.7V |
| FIRST CONTROL DEVICE 100C | 14.6V |

3
10
HV BATTERY
20
30
DC-DC CONVERTER
40
50
LV BATTERY
60
70
POWER DISTRIBUTOR
80
100A
FIRST CONTROL DEVICE
100B
FIRST CONTROL DEVICE
100C
FIRST CONTROL DEVICE
90
501
502
503
COMPONENT
102
301
51
OUTPUT VOLTAGE
CORRECTION REQUEST
210
CHANGE INSTRUCTION
201
211
SECOND CONTROL DEVICE
200

4
10
HV BATTERY
20
30
DC-DC CONVERTER
40
50
LV BATTERY
60
70
POWER DISTRIBUTOR
80
100A
FIRST CONTROL DEVICE
90
501
502
503
COMPONENT
81
100B
FIRST CONTROL DEVICE
82
100C
FIRST CONTROL DEVICE
CHANGE INSTRUCTION
201
OUTPUT VOLTAGE
51
211
SECOND CONTROL DEVICE
210
200
CORRECTION REQUEST
301
THIRD CONTROL DEVICE
300
102

4
10
HV BATTERY
20
30
DC-DC CONVERTER
40
50
LV BATTERY
60
70
POWER DISTRIBUTOR
80-1
DISCONNECTION
80-2
100A
FIRST CONTROL DEVICE
90
501
502
503
COMPONENT
CHANGE INSTRUCTION
201
211
OUTPUT VOLTAGE
51
SECOND CONTROL DEVICE
210
CORRECTION REQUEST
301
200
THIRD CONTROL DEVICE
300
102
81
100B
FIRST CONTROL DEVICE
90
501
502
503
COMPONENT
82
100C
FIRST CONTROL DEVICE
90
501
502
503
COMPONENT

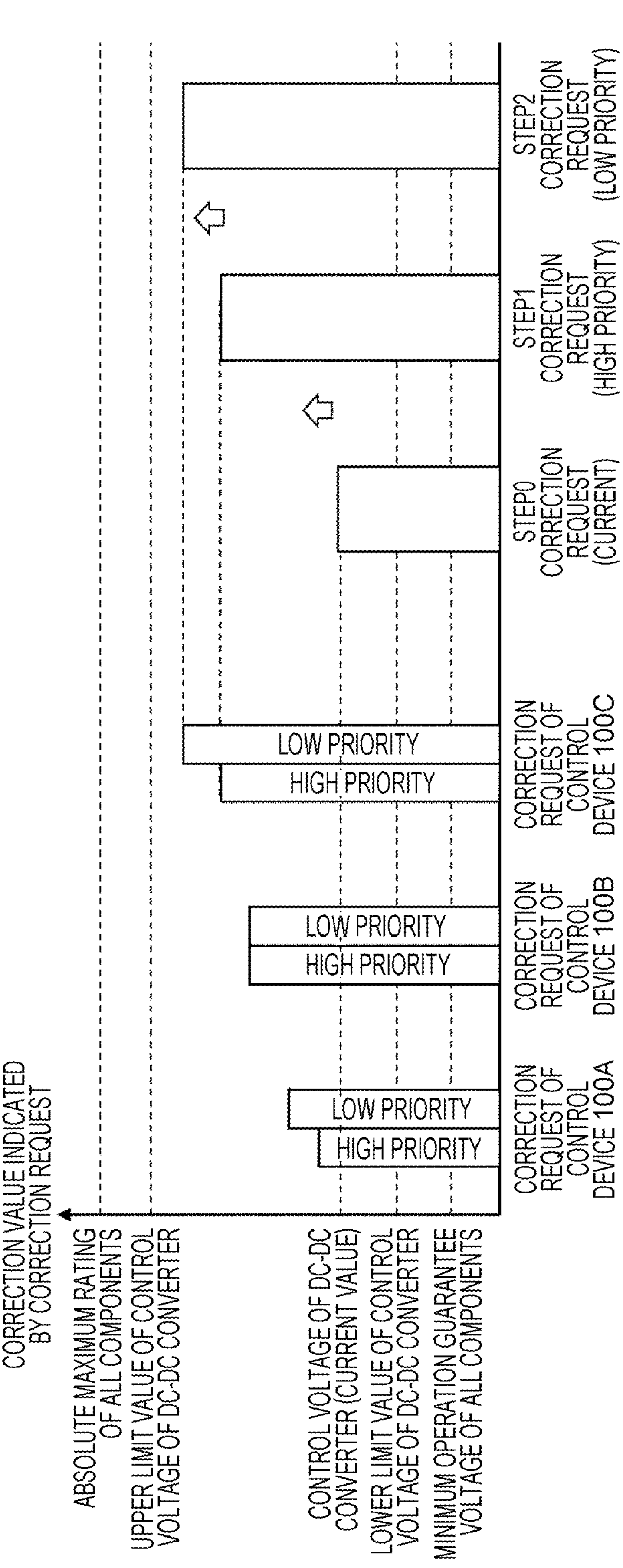
FIG. 7A
CORRECTION VALUE INDICATED BY CORRECTION REQUEST
ABSOLUTE MAXIMUM RATING OF ALL COMPONENTS
UPPER LIMIT VALUE OF CONTROL VOLTAGE OF DC-DC CONVERTER
CONTROL VOLTAGE OF DC-DC CONVERTER (CURRENT VALUE)
LOWER LIMIT VALUE OF CONTROL VOLTAGE OF DC-DC CONVERTER
MINIMUM OPERATION GUARANTEE VOLTAGE OF ALL COMPONENTS
LOW PRIORITY
HIGH PRIORITY
CORRECTION REQUEST OF CONTROL DEVICE 100A
LOW PRIORITY
HIGH PRIORITY
CORRECTION REQUEST OF CONTROL DEVICE 100B
LOW PRIORITY
HIGH PRIORITY
CORRECTION REQUEST OF CONTROL DEVICE 100C
STEP0 CORRECTION REQUEST (CURRENT)
STEP1 CORRECTION REQUEST (HIGH PRIORITY)
STEP2 CORRECTION REQUEST (LOW PRIORITY)

FIG. 7C

| DEVICE | STORED DATA OF CORRECTION REQUEST WITH HIGH PRIORITY | STORED DATA OF CORRECTION REQUEST WITH LOW PRIORITY |
|---|---|---|
| FIRST CONTROL DEVICE 100A | 14.5V | 14.6V |
| FIRST CONTROL DEVICE 100B | 14.7V | 14.7V |
| FIRST CONTROL DEVICE 100C | 14.8V | 15.0V |

ON-VEHICLE ELECTRIC POWER CONTROL SYSTEM, CONTROL DEVICE, AND AGGREGATED CONTROL DEVICE

TECHNICAL FIELD

The present disclosure relates to an on-vehicle electric power control system, and a control device and an aggregated control device mounted on the on-vehicle electric power control system.

BACKGROUND ART

Conventionally, in an electrical and electronic device, a fuse that melts by Joule heat of a current is used to prevent overheating due to overcurrent. Such a fuse that cuts off a current by fusing due to heat requires a number of steps for exchanging the fuse after fusing. In addition, it is necessary to select a thick wire harness (conductive wire) in advance in consideration of variations in fusing characteristics of fuses. For this reason, the use of the fuse causes an increase in weight and cost of the wire harness.

Therefore, in recent years, a method for realizing an overheat protection function of a conventional wire harness using a semiconductor switch using a power semiconductor and a wire harness temperature estimation technique has been used. In this method, a current value flowing through the wire harness is detected, a temperature rise of the wire harness is estimated by calculation using the current value, and the wire harness is protected by cutting off the semiconductor switch.

In overheat protection using such a semiconductor switch, when overcurrent is eliminated, the semiconductor switch can be turned on to recover power supply, so that replacement of components such as a fuse can be made unnecessary. In addition, since it is not necessary to consider variations in fusing characteristics as in the conventional fuse, a wire harness thinner than the conventional one can be used, and the weight and cost can be reduced.

PTL 1 describes an overheat protection technique using a semiconductor switch and temperature estimation of a wire harness. In PTL 1, there is a description of "An energizing current is detected every predetermined time, a current electric wire temperature is estimated using the energizing current, and the current electric wire temperature is compared with an allowable upper limit temperature of the electric wire. Even in a case where the electric wire temperature rises due to a short current that repeats on/off, it is possible to reliably detect the increase and cut off the energizing current before the electric wire reaches the smoking temperature, thereby preventing smoking of the electric wire".

CITATION LIST

Patent Literature

PTL 1: JP 2009-130944 A

SUMMARY OF INVENTION

Technical Problem

However, when the wire harness is reduced in wire diameter using the technique described in PTL 1, the wiring resistance value of the wire harness increases, and the voltage drop amount in the wire harness increases.

For example, in a wire harness that connects a power supply device and a load such as a control device, a voltage drop amount in the wire harness increases due to a reduction in wire diameter of the wire harness, whereby a power supply voltage supplied to the load decreases. Therefore, the power supply voltage supplied to the load may be lower than the operation guarantee voltage required to guarantee the performance of the load.

That is, when the wire harness is reduced in wire diameter using the technique described in PTL 1, the weight of the wire can be reduced, but there is a problem that the performance of the load of the control device and the like cannot be guaranteed, leading to redesign of the load and the like, and the influence on the vehicle system is large.

The present disclosure has been made to solve such a technical problem, and an object of the present disclosure is to suppress an influence of a power supply voltage drop caused by a wire diameter reduction of a wire harness and to appropriately secure an operation guarantee voltage of a load connected to the wire harness.

Solution to Problem

An on-vehicle electric power control system according to the present disclosure includes: a power supply device; a control device connected to the power supply device via a first power supply line; and one or a plurality of loads connected to the control device via a second power supply line. The control device includes: wiring resistance acquiring means for acquiring wiring resistance values of the first power supply line and the second power supply line; current acquiring means for acquiring a first current value supplied to the control device via the first power supply line and a second current value supplied to the load via the second power supply line; voltage drop amount calculating means for calculating voltage drop amounts in the first power supply line and the second power supply line based on the wiring resistance value acquired by the wiring resistance acquiring means, the first current value acquired by the current acquiring means, and the second current value acquired by the current acquiring means; correction value determining means for determining a correction value for correcting an output voltage of the power supply device based on the voltage drop amount calculated by the voltage drop amount calculating means; and correction request output means for outputting a correction request indicating the correction value determined by the correction value determining means.

A control device of the present disclosure is a control device of an on-vehicle electric power control system connected to a power supply device via a first power supply line and connected to one or a plurality of loads via a second power supply line, the control device including: wiring resistance acquiring means for acquiring wiring resistance values of the first power supply line and the second power supply line; current acquiring means for acquiring a first current supplied to the control device via the first power supply line and a second current supplied to the load via the second power supply line; voltage drop amount calculating means for calculating voltage drop amounts in the first power supply line and the second power supply line based on the wiring resistance value acquired by the wiring resistance acquiring means, the first current acquired by the current acquiring means, and the second current acquired by the current acquiring means; correction value determining means for determining a correction value for correcting an output voltage of the power supply device based on the voltage drop amount calculated by the voltage drop amount calculating means; and correction request output means for outputting a correction request indicating the correction value determined by the correction value determining means.

In addition, the aggregated control device of the present disclosure is an aggregated control device communicably connected to a plurality of control devices, in which the correction request selected from among the plurality of correction requests output from the correction request output means of the plurality of control devices is output to a power supply voltage control device that controls an output voltage of the power supply device.

Advantageous Effects of Invention

According to the present disclosure, it is possible to suppress the influence of the power supply voltage drop caused by the wire harness having a small diameter, and to appropriately secure the operation guarantee voltage of the device connected to the wire harness.

BRIEF DESCRIPTION OF DRAWINGS

FIG. 1C is a control flowchart of the first control device 100 according to the first embodiment.

FIG. 7A is a diagram illustrating a correction request aggregated by a third control device 300 according to a seventh embodiment.

FIG. 7C is a diagram illustrating stored data of correction requests received by the third control device 300 according to the seventh embodiment.

DESCRIPTION OF EMBODIMENTS

Figure 1A:
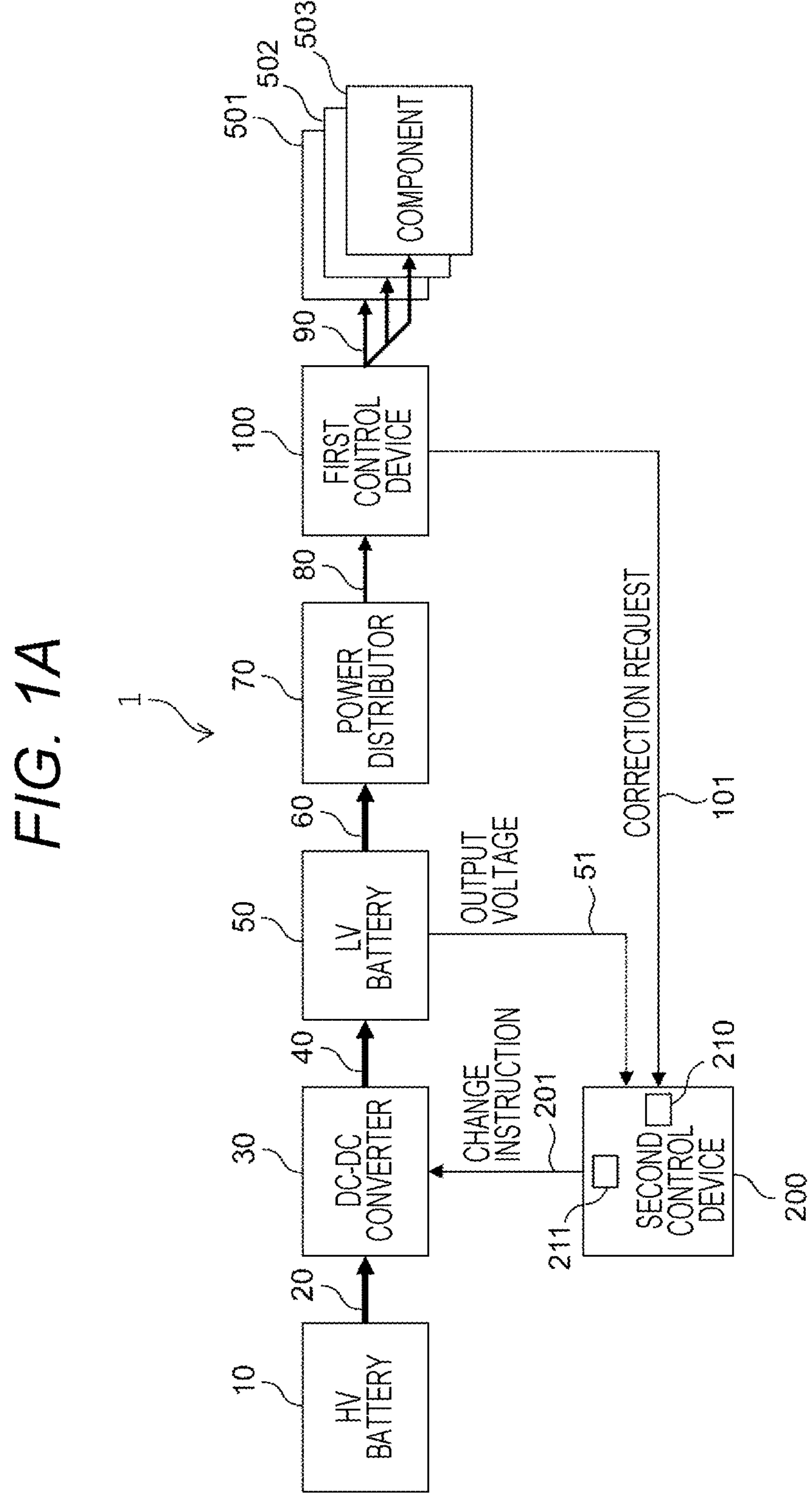
FIG. 1A is a basic configuration diagram of an on-vehicle electric power control system 1 according to a first embodiment.

Embodiments will be described in detail with reference to the drawings. However, the present invention is not to be construed as being limited to the description of the embodiments described below. Those skilled in the art can easily understand that the specific configuration can be changed without departing from the spirit or gist of the present invention.

In the configuration of the invention described below, the same reference numerals are commonly used for the same portions or portions having similar functions in different drawings, and redundant description may be omitted.

In a case where there is a plurality of elements having the same or similar functions, the same reference numerals may be attached with different subscripts for description. However, in a case where it is not necessary to distinguish a plurality of elements, the description may be omitted.

Notations such as "first", "second", and "third" in the present specification and the like are attached to identify components, and do not necessarily limit the number, order, or contents thereof. In addition, a number for identifying a component is used for each context, and a number used in one context does not necessarily indicate the same configuration in another context. In addition, it does not prevent a component identified by a certain number from also functioning as a component identified by another number.

Positions, sizes, shapes, ranges, and the like of the respective components illustrated in the drawings and the like may not represent actual positions, sizes, shapes, ranges, and the like in order to facilitate understanding of the invention. Therefore, the present invention is not necessarily limited to the position, size, shape, range, and the like disclosed in the drawings and the like.

The publications, patents, and patent applications cited herein constitute a part of the description of this specification as such.

Components expressed in the singular herein are intended to include the plural unless the context clearly dictates otherwise.

Hereinafter, embodiments of an on-vehicle electric power control system according to the present invention will be described with reference to the drawings.

First Embodiment

FIG. 1A is a basic configuration diagram of an on-vehicle electric power control system 1 according to a first embodiment. The on-vehicle electric power control system 1 is an example of a vehicle control system mounted on a vehicle.

The on-vehicle electric power control system 1 is a system that supplies a power supply voltage from a power supply device (high-voltage battery 10 or low-voltage battery 50) to various components 501 to 503 (loads). The components 501 to 503 are, for example, an electronic control unit (ECU), a sensor, a car navigation system, a lamp, an air conditioner, and the like. The on-vehicle electric power control system 1 includes a high-voltage battery 10

(HV battery in the drawing), a DC-DC converter 30, a low-voltage battery 50 (LV battery in the drawing), a power distributor 70, a first control device 100, a second control device 200, a components 501 to 503, and a first power supply line 20 to a fifth power supply line 90 connecting them.

The first power supply line 20 connects the high-voltage battery 10 and the DC-DC converter 30, the second power supply line 40 connects the DC-DC converter 30 and the low-voltage battery 50, the third power supply line 60 connects the low-voltage battery 50 and the power distributor 70, the fourth power supply line 80 connects the power distributor 70 and the first control device 100, and the fifth power supply line 90 connects the first control device 100 and each of the components 501 to 503. At least one of the first power supply line 20 to the fifth power supply line 90 is an electric power supply line of a wire harness including an electric power supply line and a signal line.

The high-voltage battery 10 is a main power supply of the vehicle, and is a large-capacity battery mainly used for driving the vehicle.

The low-voltage battery 50 (power supply device) is mainly used as a power supply source to the above-described components 501 to 503 mounted on the vehicle.

The DC-DC converter 30 has a role of performing conversion (step-down) of a DC voltage supplied from the high-voltage battery 10 to the low-voltage battery 50 and supplying power from the high-voltage battery 10 to the low-voltage battery 50. Furthermore, the DC-DC converter 30 has a function of changing an output voltage to the low-voltage battery 50. The output voltage of the low-voltage battery 50 depends on the output voltage of the DC-DC converter 30.

The power distributor 70 is disposed between the low-voltage battery 50 and the first control device 100, and is connected to the third power supply line 60 and the fourth power supply line 80. In FIG. 1A, the power distributor 70 supplies power to the first control device 100, but may distribute the power to a load other than the first control device 100.

The first control device 100 supplies the power supply voltage supplied from the power distributor 70 to one or a plurality of components 501 to 503 located downstream. The first control device 100 is connected to the low-voltage battery 50 via the third power supply line 60 and the fourth power supply line 80. The plurality of components 501 to 503 are connected to the first control device 100 via the fifth power supply line 90. Details of the first control device 100 will be described later.

The second control device 200 (power supply voltage control device) monitors the output voltage of the low-voltage battery 50 via a signal line 51 and aggregates vehicle information (for example, the operation guarantee voltage of each of the components 501 to 503) related to power generation from each of the components 501 to 503 and the like on the vehicle. A correction request receiving unit 210 of the second control device 200 receives a correction request transmitted from the first control device 100 via a signal line 101. A correction value instructing unit 211 of the second control device 200 instructs the DC-DC converter 30 to change the output voltage via a signal line 201. The second control device 200 instructs the DC-DC converter 30 to change the output voltage according to the correction value indicated by the received correction request. Communication connecting the first control device 100, the second control device 200, and the DC-DC converter 30 is communicably connected by a communication protocol adopted in vehicles such as a controller area network (CAN), a local interconnect network (LIN), and Ethernet.

Figure 1B:
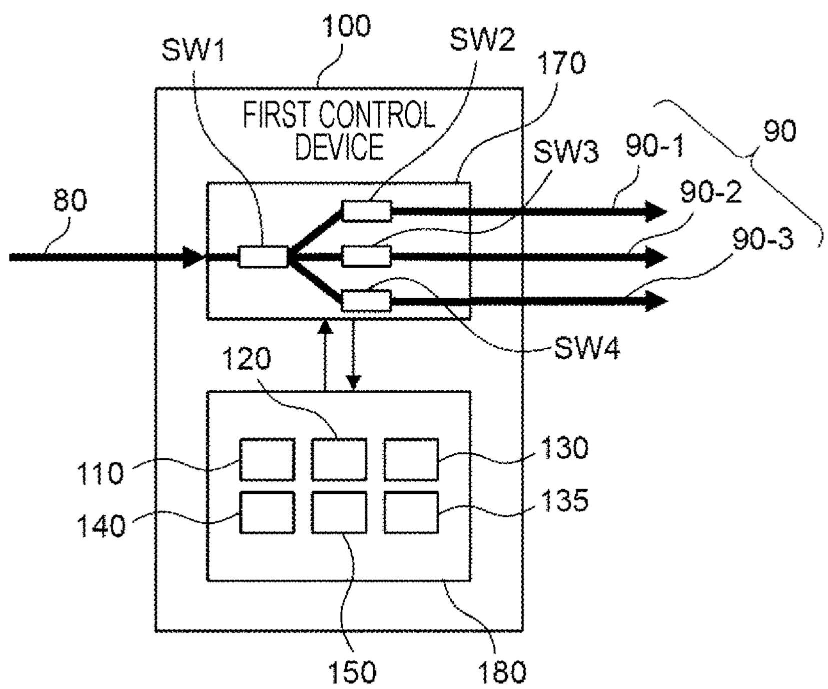
FIG. 1B is an internal configuration diagram of a first control device 100 of the first embodiment.

Hereinafter, details of the first control device 100 will be described with reference to FIG. 1B. FIG. 1B is an internal configuration diagram of the first control device 100 according to the first embodiment.

The first control device 100 includes a semiconductor switch 170 that supplies or cuts off a power supply voltage to the components 501 to 503, and a microcomputer 180 that controls the semiconductor switch 170.

The semiconductor switch 170 includes, for example, an intelligent power device (IPD) or a semiconductor discrete component. The semiconductor switch 170 is connected to the fourth power supply line 80 connected to the power distributor 70 and the fifth power supply line 90 connected to the components 501 to 503, and supplies and cuts off a power supply voltage. In addition, the semiconductor switch 170 measures current and voltage input to the semiconductor switch 170 and measures current and voltage output from the semiconductor switch 170. In addition, the semiconductor switch 170 has a function of performing failure diagnosis, self-diagnosis, and the like.

The semiconductor switch 170 includes a switch SW1 connected to the fourth power supply line 80, a switch SW2 connected to a power supply line 90-1 of the fifth power supply line 90, a switch SW3 connected to a power supply line 90-2, and a switch SW4 connected to a power supply line 90-3. Each of the switches SW1 to SW4 is a semiconductor switch such as a MOSFET. The semiconductor switch 170 measures current and voltage supplied to the fourth power supply line 80. The semiconductor switch 170 measures current and voltage supplied to each of the power supply lines 90-1 to 90-3 of the fifth power supply line 90. The measured current value and voltage value are transmitted to the microcomputer 180.

The microcomputer 180 is an information processing device including a central processing unit (CPU), a memory, and the like, and has functions of a wiring resistance acquiring unit 110 (wiring resistance acquiring means), a current acquiring unit 120 (current acquiring means), a voltage drop amount calculating unit 130 (voltage drop amount calculating means), a component information unit 135, a correction value determining unit 140 (correction value determining means), a correction request transmitting unit 150 (correction request output means), and the like. In addition, the microcomputer 180 has a function of performing various failure diagnosis, self-diagnosis, and the like. Each unit will be described later.

For example, as illustrated in FIG. 1B, the wiring resistance acquiring unit 110 includes information such as a wiring resistance value (reference wiring resistance value) from the low-voltage battery 50 to the components 501 to 503 and a switching resistance value of the semiconductor switch 170. Specifically, the wiring resistance acquiring unit 110 has a wiring resistance value (upstream) from the low-voltage battery 50 to the first control device 100 and a wiring resistance value (downstream) from the first control device 100 to the components 501 to 503. For example, the wiring resistance value (upstream) is a combined resistance value of the third power supply line 60 and the fourth power supply line 80, and the wiring resistance value (downstream) is each resistance value of the power supply lines 90-1 to 90-3 of the fifth power supply line 90, but the wiring resistance value is not limited thereto, and may include, for example, a switching resistance value and a contact resistance value of a connector. The information included in the wiring resistance acquiring unit 110 is written in the microcomputer 180 when the first control device 100 is manufactured in advance, or is written in the microcomputer 180 after the first control device 100 is mounted on the vehicle. Furthermore, the information included in the wiring resistance acquiring unit 110 may be updated as appropriate.

Furthermore, the wiring resistance acquiring unit 110 also has a function of calculating a temperature estimation value of the wire harness (fourth power supply line 80, fifth power supply line 90 (power supply lines 90-1 to 90-3)) based on the current value and the energization time measured by the semiconductor switch 170 described above, and adding a fluctuation in the wiring resistance value due to the calculated temperature estimation value to the wiring resistance value described above. The voltage drop amount from the low-voltage battery 50 to the components 501 to 503 can be calculated with high accuracy by taking into account the change in the wiring resistance value due to the temperature change. Further, in the present embodiment, the function of taking into account the fluctuation in the wiring resistance value due to the temperature change is arranged on the microcomputer 180, but the function may be arranged other than the microcomputer 180.

The current acquiring unit 120 acquires each current value measured by the semiconductor switch 170. Specifically, the current acquiring unit 120 acquires a current value (upstream) supplied from the low-voltage battery 50 to the first control device 100 and each current value (downstream) supplied from the first control device 100 to the components 501 to 503.

The voltage drop amount calculating unit 130 calculates the voltage drop amount from the low-voltage battery 50 to the components 501 to 503 based on the wiring resistance value (upstream, downstream) acquired from the wiring resistance acquiring unit 110 and the current value (upstream, downstream) acquired from the current acquiring unit 120.

The component information unit 135 stores information on the operation guarantee voltages of the components 501 to 503 connected to the first control device 100. The information stored in the component information unit 135 is written in the microcomputer 180 when the first control device 100 is manufactured in advance, or is written in the microcomputer 180 after the first control device 100 is mounted on the vehicle. Furthermore, the information stored in the component information unit 135 may be updated as appropriate.

The correction value determining unit 140 calculates a correction value of the power supply voltage based on the voltage drop amount from the low-voltage battery 50 to the components 501 to 503 calculated by the voltage drop amount calculating unit 130 and the operation guarantee voltage stored in the component information unit 135. Specifically, the correction value determining unit 140 compares the power supply voltage value supplied by the semiconductor switch 170 with the voltage drop amount from the low-voltage battery 50 to the components 501 to 503 calculated by the voltage drop amount calculating unit 130 and the operation guarantee voltage stored by the component information unit 135, calculates the minimum power supply voltage necessary for the components 501 to 503, and calculates the correction value of the power supply voltage.

The correction request transmitting unit 150 transmits a correction request indicating the correction value of the power supply voltage calculated by the correction value determining unit 140 to the second control device 200.

Hereinafter, a method of correcting the power supply voltage of the present embodiment will be described with reference to FIG. 1C. FIG. 1C is a control flowchart of the first control device 100 according to the first embodiment. Each step of the flowchart of FIG. 1C is executed by the processor of the microcomputer 180 executing a program expanded in the memory. The flowchart illustrated in FIG. 1C is executed at regular time intervals or variable time intervals after the start-up processing, the initialization processing, and the like of the first control device 100 are completed.

First, in step S110, the microcomputer 180 acquires a reference wiring resistance value (upstream, downstream) not considering a temperature change from the low-voltage battery 50 to the components 501 to 503.

Next, in step S120, the microcomputer 180 acquires the current value (upstream, downstream) measured by the semiconductor switch 170 and the energization time.

In step S130, the microcomputer 180 estimates a temperature rise value in the wire harness (third power supply line 60, fourth power supply line 80, and fifth power supply line 90) based on the reference wiring resistance value (upstream, downstream), the current value (upstream, downstream), and the energization time.

In step S140, the microcomputer 180 acquires the wiring resistance value (upstream, downstream) accompanying the temperature change based on the reference wiring resistance value (upstream, downstream) and the temperature rise value described above.

In step S150, the microcomputer 180 calculates the voltage drop amount (upstream, downstream) from the low-voltage battery 50 to the components 501 to 503 based on the current value (upstream, downstream) and the wiring resistance value (upstream, downstream) accompanying the temperature change. Hereinafter, an example of the calculation formula is shown in Formulas (1) and (2). Here, with reference to the semiconductor switch 170, the microcomputer 180 calculates the voltage drop amount (upstream) from the low-voltage battery 50 to the semiconductor switch 170 by Formula (1), and calculates the voltage drop amount (downstream) from the semiconductor switch 170 to the components 501 to 503 by Formula (2). In the example of FIG. 1A, since three components 501 to 503 are connected to the semiconductor switch 170, three voltage drop amounts (downstream) are calculated using Formula (2), and the largest voltage drop amount is set as the voltage drop amount (downstream).

$$\text{Voltage drop amount (upstream) } Vf\_ba = \text{current value (upstream)} \times \text{wiring resistance value (upstream)} \quad \text{Formula (1)}$$

$$\text{Voltage drop amount (downstream) } Vf\_ba = \text{current value (downstream)} \times \text{wiring resistance value (downstream)} \quad \text{Formula (2)}$$

In step S160, the microcomputer 180 acquires a power supply voltage serving as a reference for calculating the correction request.

In step S170, the microcomputer 180 calculates a correction value of the power supply voltage from the power supply voltage serving as the reference, the voltage drop amount (upstream), the voltage drop amount (downstream), and the operation guarantee voltage acquired from the component information unit 135. The following Formulas (4) and (5) are executed in a case where Vc_Pre<Vc_lowlimit, and the correction value of the power supply voltage is calculated.

$$Vc\_pre = Va - Vf\_ac \quad \text{Formula (3)}$$

$$Vreq = Vc\_lowlimit - Vc\_pre \quad \text{Formula (4)}$$

$$Vreq\_total = Vf\_ba + Vreq + Va \quad \text{Formula (5)}$$

Here, the meanings of the signs of Formulas (3) to (5) will be described as follows.

Va: Power supply voltage value recognized by first control device 100

Vc_pre: Power supply voltage value in downstream component calculated by first control device 100

Vc_lowlimit: Lower limit value of operation guarantee voltages of components 501 to 503

Vreq: Power supply voltage correction relative value required by components 501 to 503

Vreq_total: Correction value of correction request transmitted from first control device 100 to second control device 200

In step S180, the microcomputer 180 transmits a correction request indicating the correction value of the power supply voltage calculated in step S170 to the correction request receiving unit 210 of the second control device 200.

When receiving the correction request of the power supply voltage from the microcomputer 180, the second control device 200 transmits a change instruction for changing the output voltage of the DC-DC converter 30 to the DC-DC converter 30 according to the correction request.

Effects of First Embodiment

According to the on-vehicle electric power control system 1 of the present embodiment, the voltage drop amounts in the third power supply line 60, the fourth power supply line 80, and the fifth power supply line 90 can be calculated based on the wiring resistance value (upstream, downstream) and the current value (upstream, downstream) from the low-voltage battery 50 to the downstream components 501 to 503. Then, it is possible to timely compare the power supply voltage supplied to the components 501 to 503 calculated from the power supply voltage of the low-voltage battery 50 and the calculated voltage drop amount with the operation guarantee voltage values of the downstream components 501 to 503. As a result, in a case where the power supply voltage supplied to the components 501 to 503 is lower than the operation guarantee voltage value, it is possible to calculate a correction value in consideration of the voltage drop amount from the low-voltage battery 50 to the components 501 to 503 and transmit a correction request indicating the correction value to the DC-DC converter 30. As a result, the operation guarantee voltages required by the components 501 to 503 can be secured in a timely manner.

Second Embodiment

Figure 2A:
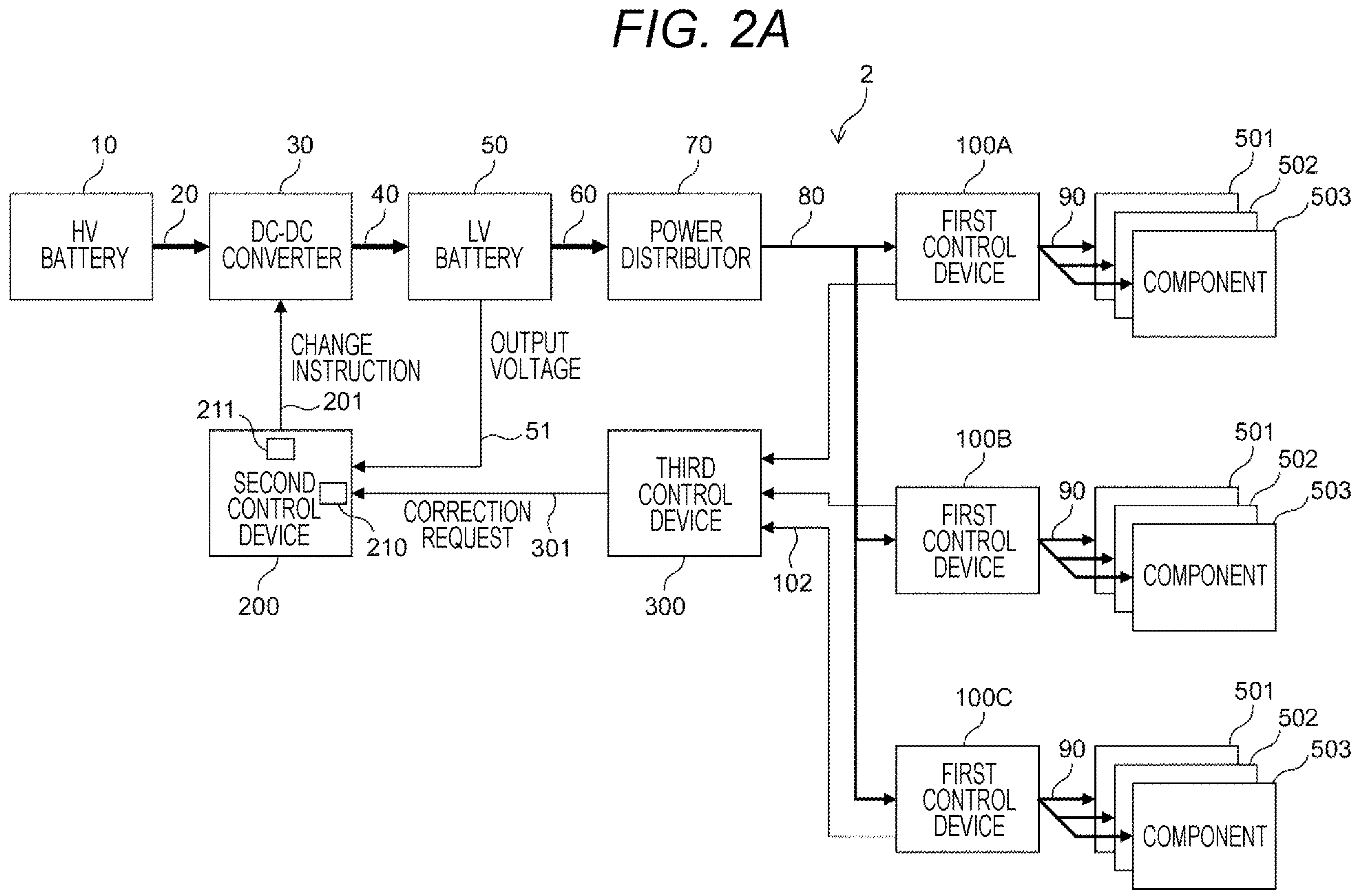
FIG. 2A is a basic configuration diagram of an on-vehicle electric power control system 2 according to a second embodiment.

Hereinafter, a second embodiment will be described with reference to FIGS. 2A to 2D. FIG. 2A is a basic configuration diagram of an on-vehicle electric power control system 2 according to the second embodiment. The on-vehicle electric power control system 2 is an example of a vehicle control system to which the present invention is applied. Description of contents overlapping with the first embodiment will be omitted.

In the configuration in which the plurality of first control devices 100A to 100C are connected in parallel to one power distributor 70, the on-vehicle electric power control system 2 of the present embodiment suppresses the complexity of the correction of the power supply voltage due to the increase or decrease of the first control devices 100A to 100C. The present embodiment is different from the first embodiment described above in that correcting the power supply voltage is considered based on the correction requests transmitted from the plurality of first control devices 100A to 100C.

Each of the plurality of first control devices 100A to 100C is a zone ECU and is provided for each zone of the vehicle. The plurality of first control devices 100A to 100C are arranged in the front of the vehicle, the rear of the vehicle, and the interior of the vehicle, and have a role of supplying a power supply voltage to the components 501 to 503 arranged near each control device. In FIG. 2A, three first control devices 100A to 100C are connected, but the number of mounted first control devices increases or decreases depending on the vehicle.

A third control device 300 (aggregated control device) receives and aggregates the correction requests transmitted from the plurality of first control devices 100A to 100C, and transmits the aggregated correction requests to the second control device 200. When the third control device 300 aggregates the correction requests, the power supply voltage can be appropriately corrected without changing the communication control of the second control device 200 having a relatively low function even if the number of first control devices 100A to 100C is plural or the number of connected components 501 to 503 is increased.

The third control device 300 is an ECU for performing integrated control such as automatic driving of the vehicle, is connected to the first control devices 100A to 100C by CAN or Ethernet communication, and communicates with the third control device 300 in a communication format determined in advance. The third control device 300 includes a communication circuit so as to be able to cope with an increase or decrease in the number of connections of the first control devices 100A to 100C in advance.

As illustrated in FIG. 2A, the plurality of first control devices 100A to 100C are connected from the power distributor 70 via the fourth power supply line 80.

Each of the first control devices 100A to 100C is connected to a single or a plurality of components 501 to 503 via the fifth power supply line 90. Each of the first control devices 100A to 100C calculates a correction value of the power supply voltage, and transmits a correction request to the third control device 300 via the signal line 102.

The third control device 300 transmits a correction request selected from among the plurality of correction requests received from the plurality of first control devices 100A to 100C to the second control device 200 via a signal line 301. When receiving the selected correction request, the second control device 200 controls the output voltage of the DC-DC converter 30 according to the correction request.

Figure 2B:
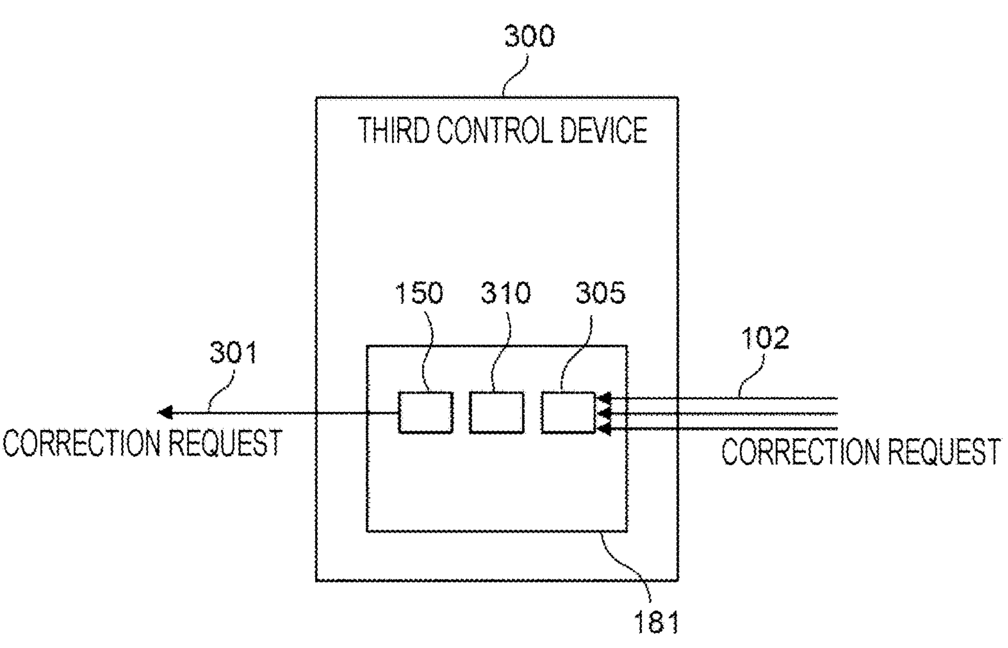
FIG. 2B is an internal configuration diagram of a third control device 300 of the second embodiment.

FIG. 2B is an internal configuration diagram of the third control device 300 according to the second embodiment. The third control device 300 includes a microcomputer 181. The microcomputer 181 includes a correction request receiving unit 305, a correction request aggregating unit 310, and a correction request transmitting unit 150.

Figure 2C:
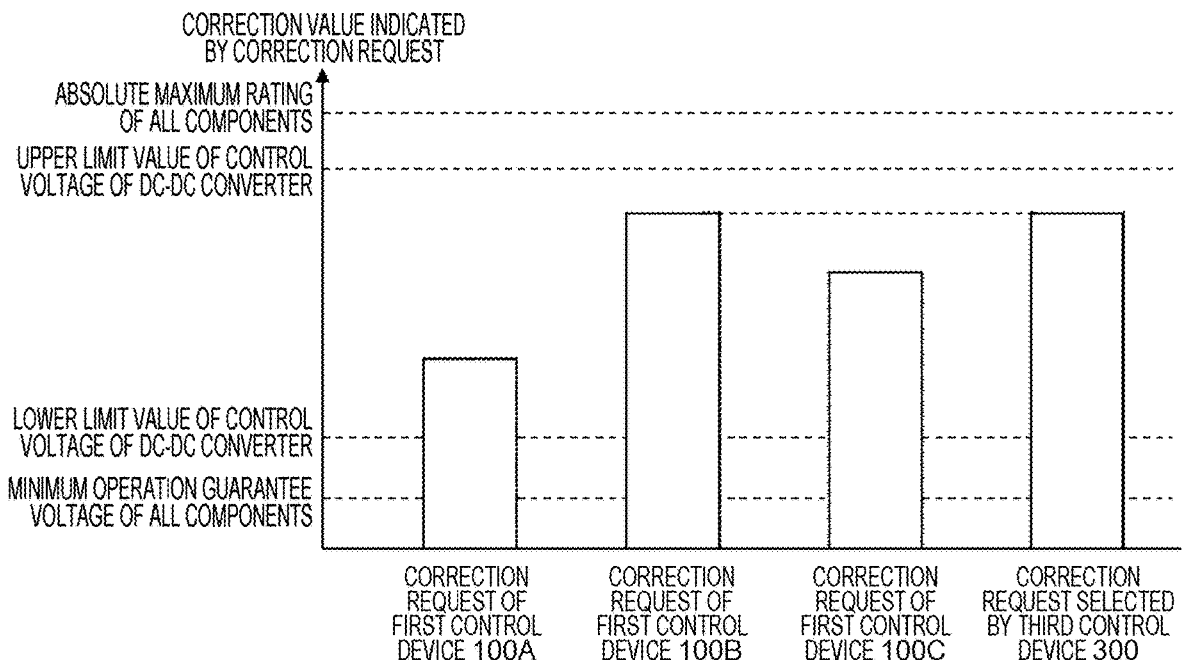
FIG. 2C is a diagram illustrating a correction request aggregated by the third control device 300 according to the second embodiment.
Figures 2D, 2E:
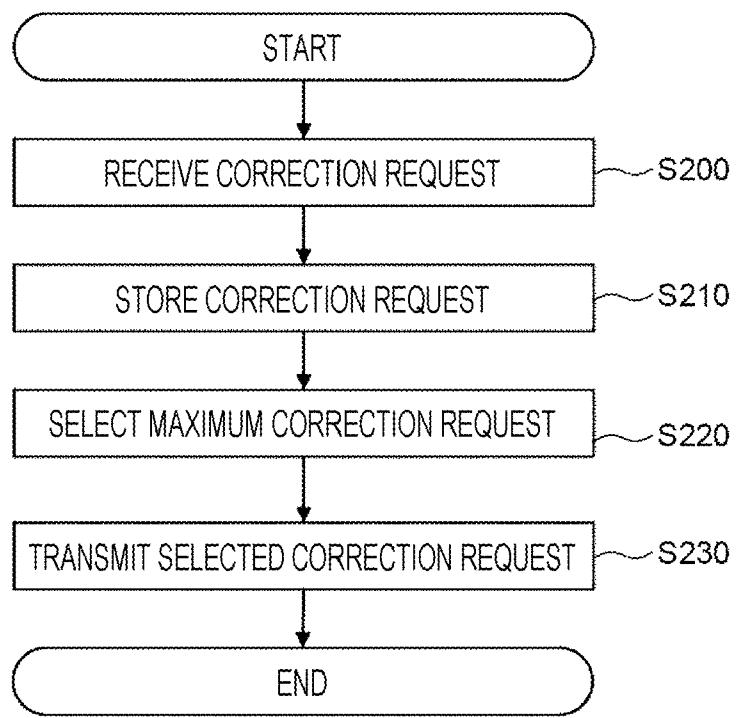
FIG. 2D is a diagram illustrating stored data of correction requests received by the third control device 300 of the second embodiment.
FIG. 2E is a control flowchart of the third control device according to the second embodiment.

FIG. 2C is a diagram illustrating a correction request aggregated by the third control device 300 according to the second embodiment. FIG. 2D is a diagram illustrating stored data of the correction requests received by the third control device 300 of the second embodiment. For example, as illustrated in FIG. 2D, the third control device 300 receives and stores a correction request indicating 14.5 V from the first control device 100A, receives and stores a correction request indicating 14.7 V from the first control device 100B, and receives and stores a correction request indicating 14.6 V from the first control device 100C.

As illustrated in FIG. 2C, the third control device 300 selects the correction request having the highest voltage value from among the plurality of stored correction requests. In the example of FIG. 2C, the third control device 300 selects the correction request (correction value: 14.7 V) received from the first control device 100B. Then, the third control device 300 transmits the selected correction request (correction value: 14.7 V) to the second control device 200 via the signal line 301.

As illustrated in FIG. 2C, the third control device 300 (warning means) gives warning as a precursor of failure in a case where the correction values indicated by the plurality of received correction requests are out of the predetermined range. As a warning method, a warning is displayed on a display device communicably connected to the third control device 300, or a warning sound is issued from a sound output device. The upper limit value of the predetermined range is the minimum value of the absolute maximum ratings of the one or plurality of components 501 to 503, and the lower limit value of the predetermined range is the maximum value of the minimum operation guarantee voltages of the one or more components 501 to 503.

Hereinafter, the voltage correction control processing of the present embodiment will be described with reference to FIG. 2E. FIG. 2E is a control flowchart of the third control device 300 according to the second embodiment. The flowchart illustrated in FIG. 2E is executed at regular time intervals or variable time intervals after the start-up processing, the initialization processing, and the like of the third control device 300 are completed. The power supply voltage correction method executed by the first control devices 100A to 100C is similar to that of the first embodiment, and thus the description thereof will be omitted.

First, in step S200, the microcomputer 181 (correction request receiving unit 305) of the third control device 300 receives the correction requests from the plurality of first control devices 100A to 100C.

In step S210, the microcomputer 181 stores the plurality of received correction requests in the memory of the microcomputer.

In step S220, the microcomputer 181 selects one correction request having the maximum correction value from among the plurality of correction requests stored in the memory.

In step S230, the microcomputer 181 transmits a correction request in which the selected correction value becomes the maximum value to the second control device 200. In the examples of FIGS. 2C and 2D, since the correction value of the correction request received from the first control device 100B is the maximum value, the microcomputer 181 transmits the correction request received from the first control device 100B to the second control device 200.

Effects of Second Embodiment

According to the on-vehicle electric power control system 2 of the present embodiment, even in a system to which a plurality of first control devices 100A to 100C are connected, it is possible to obtain the same operational effects as those of the above-described first embodiment.

Further, the third control device 300 aggregates the correction requests transmitted from the plurality of first control devices 100A to 100C, and thus, even in a case where the number of the first control devices 100A to 100C mounted increases or decreases, it is not necessary to change the communication protocol between the second control device 200 and the third control device 300, and the second control device 200 described in the first embodiment can be used as it is.

In addition, the third control device 300 can supply the power supply voltage equal to or higher than the correction values of the correction requests received from the first control devices 100A to 100C to the first control devices 100A to 100C by selecting the correction request having the maximum correction value. That is, as the third control device 300 aggregates the correction requests, it is possible to shorten the time for determining the power supply voltage to be supplied and the time until the power supply voltage is supplied.

Third Embodiment

Figure 3A:
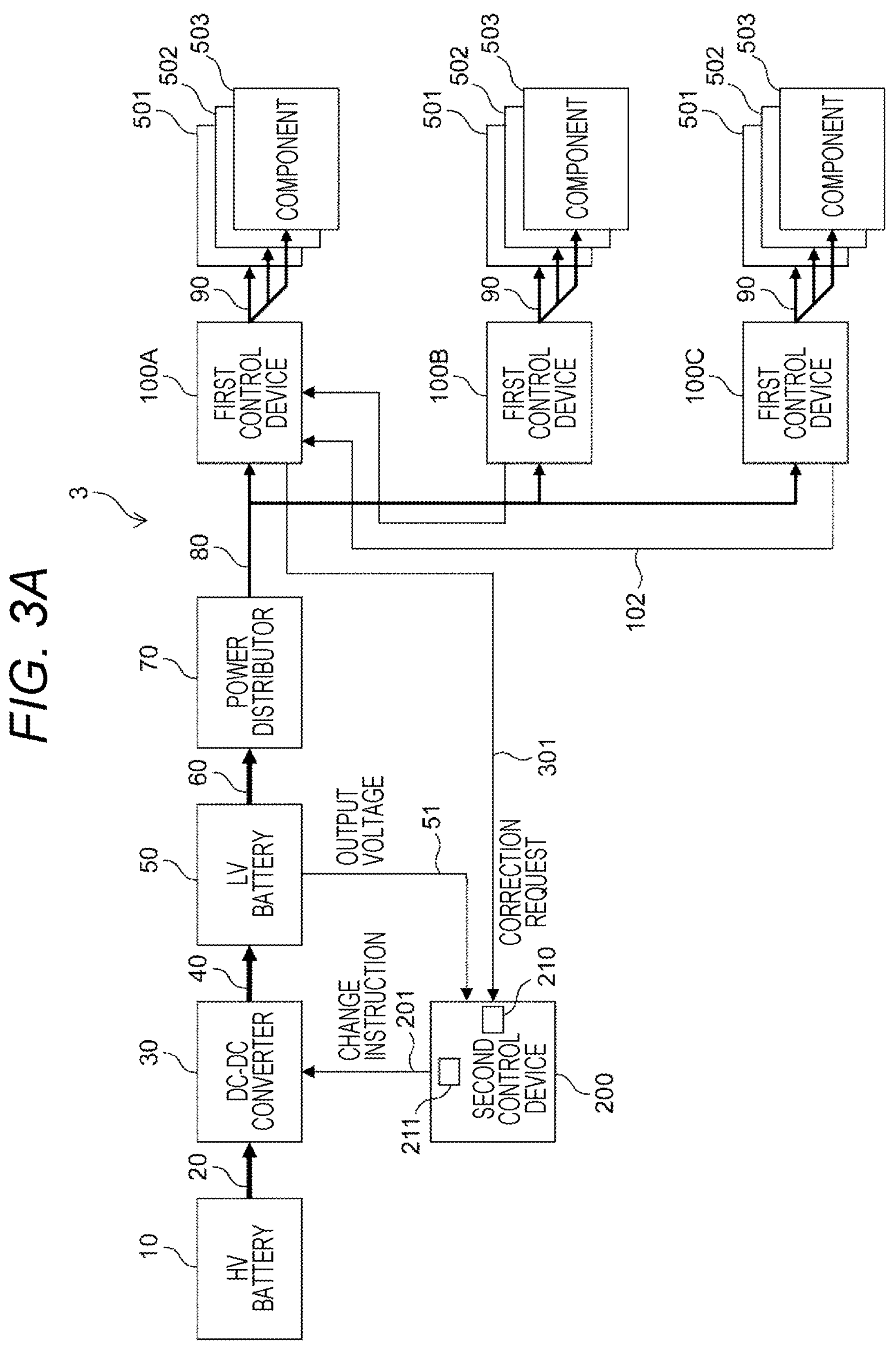
FIG. 3A is a basic configuration diagram of an on-vehicle electric power control system 3 according to a third embodiment.

Hereinafter, a third embodiment will be described with reference to FIGS. 3A and 3B. FIG. 3A is a basic configuration diagram of an on-vehicle electric power control system 3 according to the third embodiment. The on-vehicle electric power control system 3 is an example of a vehicle control system to which the present invention is applied. Description of contents overlapping with the above-described embodiment will be omitted.

The on-vehicle electric power control system 3 of the present embodiment is different from that of the second embodiment described above in that the correction requests transmitted from the plurality of first control devices 100A to 100C are aggregated by the first control device 100A. Therefore, in the present embodiment, the third control device 300 of the second embodiment is unnecessary.

Specifically, the correction value is calculated in each of the plurality of first control devices 100A to 100C. The first control device 100A among the plurality of first control devices 100A to 100C receives a correction request from the other first control devices 100B and 100C via a signal line 102. In addition, the first control device 100A selects one correction request from among its own correction request and the received correction requests, and transmits the correction request to the second control device 200 via the signal line 301.

Figure 3B:
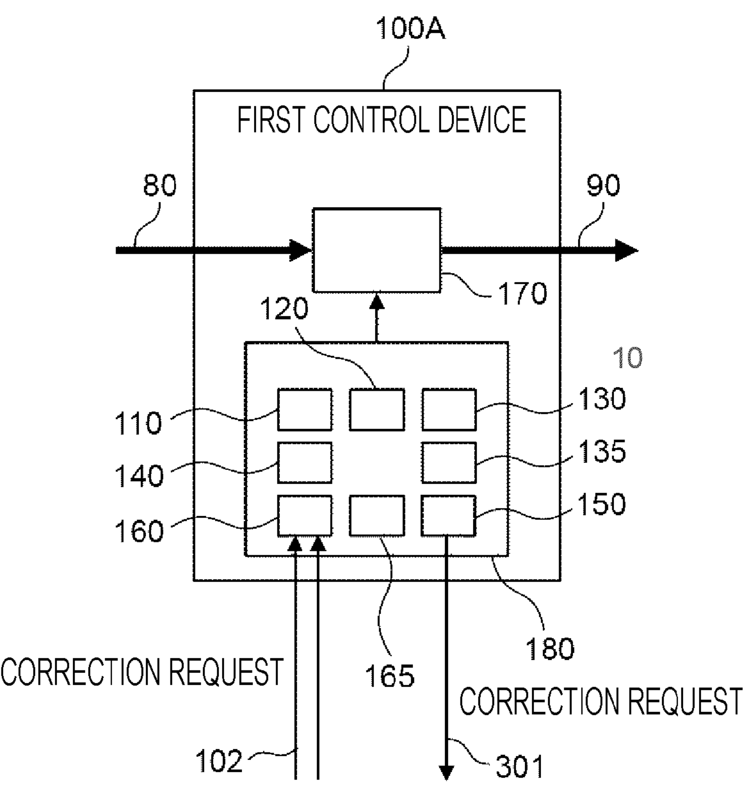
FIG. 3B is an internal configuration diagram of a first control device 100A according to the third embodiment.

FIG. 3B is an internal configuration diagram of the first control device 100A according to the third embodiment. The present embodiment is different from the first control device 100 described above with reference to FIG. 1B in that a correction request receiving unit 160 and a correction request aggregating unit 165 are included.

The correction requests transmitted by the first control devices 100B and 100C and the correction request in the own device (first control device 100A) are received by the correction request receiving unit 160 and transmitted to the correction request aggregating unit 165. The correction request aggregating unit 165 selects a correction request having the largest correction value from among a plurality of correction requests, and transmits the selected correction request to the correction request transmitting unit 150. The correction request transmitting unit 150 transmits the selected correction request to the second control device 200.

Effects of Third Embodiment

According to the on-vehicle electric power control system 3 of the present embodiment, it is possible to obtain the same operations and effects as those of the second embodiment described above even in a system not including the third control device 300. In the third embodiment, as compared with the second embodiment, since the third control device 300 is not provided, the device configuration is simplified and the cost can be reduced.

Fourth Embodiment

Figure 4A:
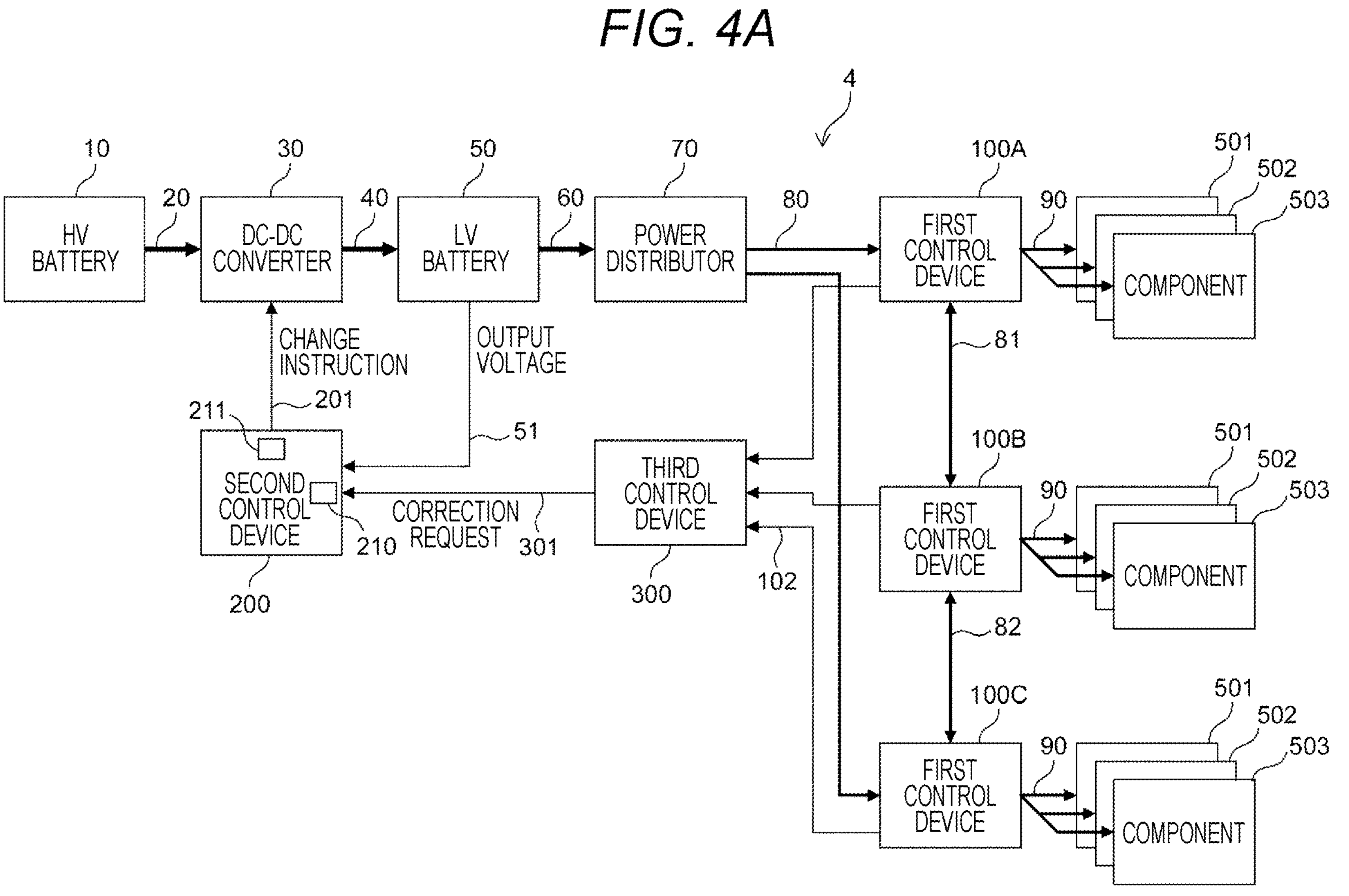
FIG. 4A is a basic configuration diagram of an on-vehicle electric power control system 4 according to a fourth embodiment.

Hereinafter, a fourth embodiment will be described with reference to FIGS. 4A to 4B. FIG. 4A is a basic configuration diagram of an on-vehicle electric power control system 4 according to the fourth embodiment. The on-vehicle electric power control system 4 is an example of a vehicle control system to which the present invention is applied. Description of contents overlapping with the above-described embodiment will be omitted.

In the on-vehicle electric power control system 4 of the present embodiment, the power supply lines of the plurality of first control devices 100A to 100C are connected by a ring topology. Specifically, the power distributor 70 and the two first control devices 100A and 100C are connected by a fourth power supply line 80, the adjacent first control devices 100A and 100B are connected by a sixth power supply line 81, and the adjacent first control devices 100B and 100C are connected by a seventh power supply line 82. Other configurations are the same as those of the second embodiment.

By dividing the fourth power supply line 80 into two systems from the power distributor 70 to form a redundant configuration, even if a failure occurs in any of the fourth power supply line 80, the sixth power supply line 81, and the seventh power supply line 82, the power supply voltage can be supplied from the power distributor 70 to each of the first control devices 100A to 100C via another power supply line. As a result, the reliability of the on-vehicle electric power control system 4 can be improved.

Figure 4B:
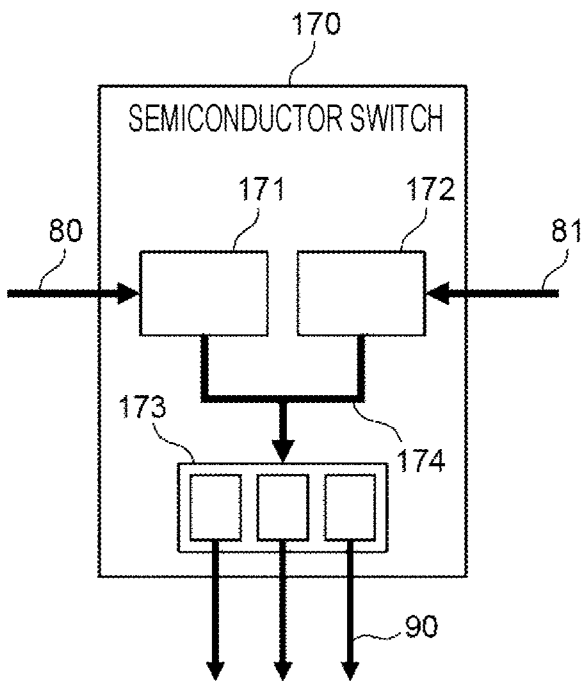
FIG. 4B is an internal configuration diagram of a semiconductor switch 170 according to the fourth embodiment.

FIG. 4B is an internal configuration diagram of the semiconductor switch 170 according to the fourth embodiment. Since the semiconductor switches 170 of the first control devices 100B and 100C also have the same configuration as the semiconductor switch 170 of the first control device 100A, the description thereof will be omitted. The semiconductor switch 170 is provided with a semiconductor switch 171 connected to the fourth power supply line 80, a semiconductor switch 172 connected to the sixth power supply line 81, and a semiconductor switch group 173 connected to each of the components 501 to 503.

In addition, the semiconductor switch 171, the semiconductor switch 172, and the semiconductor switch group 173 described above are connected to each other by an internal power supply line 174. The semiconductor switch 171, the semiconductor switch 172, and the semiconductor switch group 173 are controlled to be turned on and off by a control signal from a microcomputer.

The semiconductor switch group 173 is connected to the plurality of components 501 to 503 via the fifth power supply line 90. The power supply voltage supplied to the semiconductor switch 170 is supplied to the plurality of components 501 to 503 via the semiconductor switch group 173.

Figure 4C:
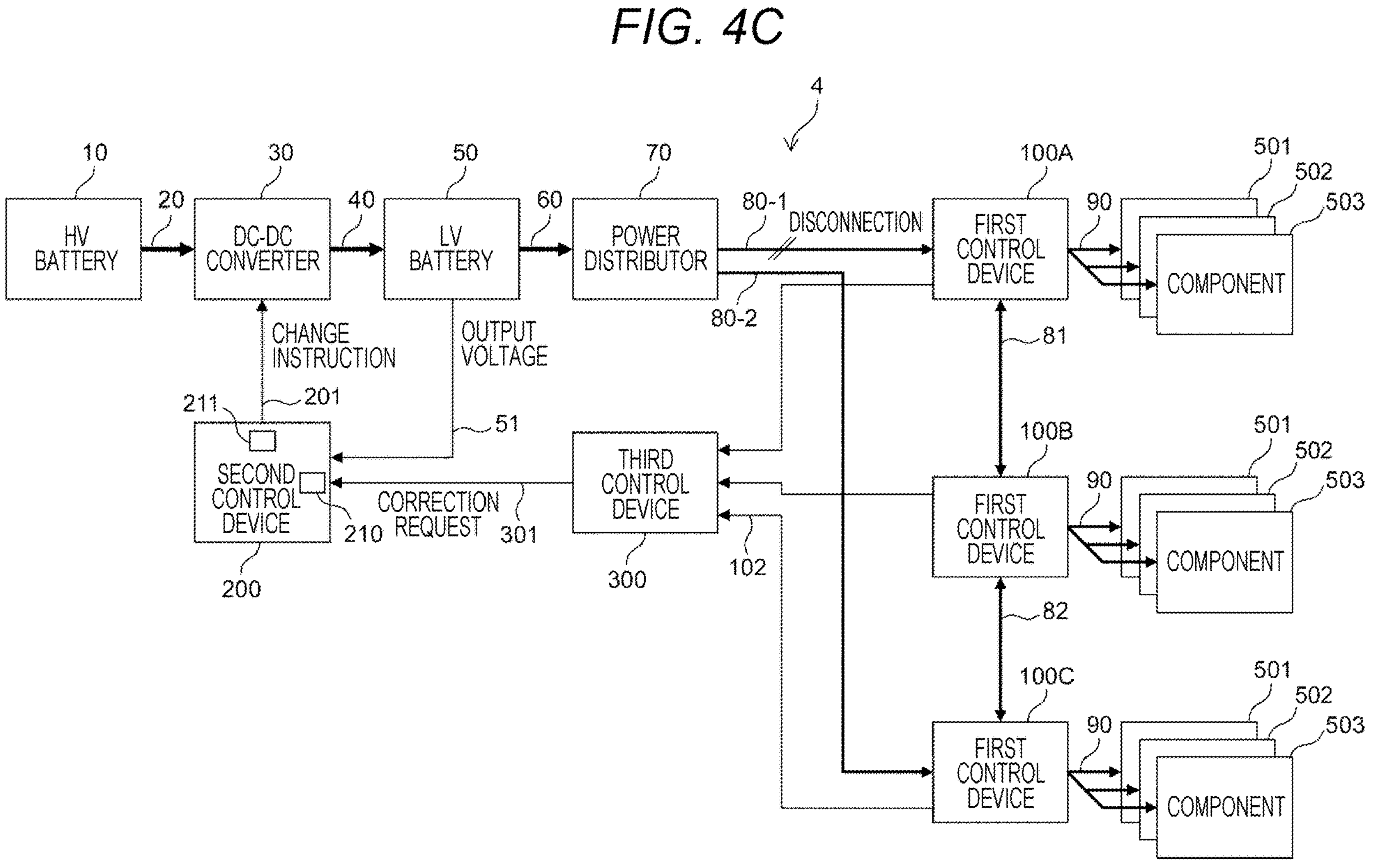
FIG. 4C is a diagram illustrating the on-vehicle electric power control system 4 when an electric power supply line is disconnected according to the fourth embodiment.

Next, operations and effects of the present embodiment will be described with reference to FIG. 4C. FIG. 4C is a diagram illustrating the on-vehicle electric power control system 4 according to the fourth embodiment when a power supply line is disconnected.

In a case where a fourth power supply line 80-1 is disconnected, the power supply voltage cannot be directly supplied from the power distributor 70 to the first control device 100A. In this case, the power supply voltage cannot be supplied to the components 501 to 503 connected to the first control device 100A.

In the present embodiment, since the plurality of first control devices 100A to 100C are connected by the ring topology, the power supply voltage can be supplied from the power distributor 70 to the first control device 100A via a first power supply voltage supply path (fourth power supply line 80-2, first control device 100C, seventh power supply line 82, first control device 100B, and sixth power supply line 81).

On the other hand, in a case where the fourth power supply line 80-1 is not disconnected, the power supply voltage is supplied from the power distributor 70 to the first control device 100A via a second power supply voltage supply path (fourth power supply line 80-1).

Since the path of the power supply voltage in a case where the fourth power supply line 80-1 is not disconnected is different from the path of the power supply voltage in a case where the fourth power supply line 80-1 is disconnected, the voltage drop amount in the path also changes between the normal state and the abnormal state. Therefore, in a case where the fourth power supply line 80-1 is not disconnected, the first control device 100A calculates the correction value in consideration of the voltage drop amounts in the third power supply line 60, the fourth power supply line 80-1, and the fifth power supply line 90, and transmits the correction request. On the other hand, in a case where the fourth power supply line 80-1 is disconnected, the first control device 100A calculates the correction value in consideration of the voltage drop amounts in the third power supply line 60, the fourth power supply line 80-2, the seventh power supply line 82, the sixth power supply line 81, and the fifth power supply line 90, and transmits the correction request.

Even in a case where the fourth power supply line 80-2, the sixth power supply line 81, or the seventh power supply line 82 is disconnected, the method for calculating the correction value is similar to that described above, and thus the description thereof will be omitted.

Effects of Fourth Embodiment

In a case where the power supply voltage cannot be supplied from the power distributor 70 to the first control device 100A due to the disconnection of the fourth power supply line 80-1, the power supply voltage can be supplied to the first control device 100A and the components 501 to 503 via the bypassed power supply line connected by the ring topology. At this time, the first control device 100A calculates the correction value in consideration of the voltage drop amount, the switching resistance, and the like at the bypassed power supply line, and transmits the correction request, so that the same operations and effects as those of the first embodiment can be obtained even when the power supply line is disconnected.

Fifth Embodiment

Figure 5A:
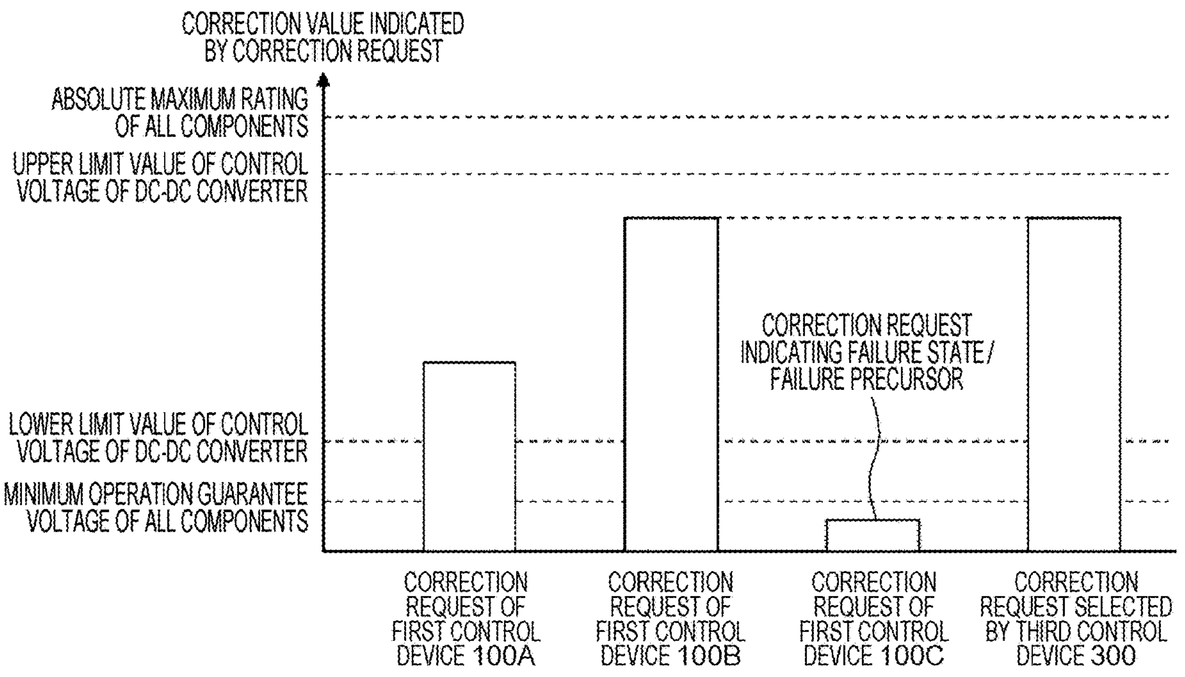
FIG. 5A is a diagram illustrating a correction request aggregated by a third control device 300 according to a fifth embodiment.

Next, a fifth embodiment will be described with reference to FIGS. 5A and 5B. FIG. 5A illustrates a correction request aggregated by the third control device 300.

The on-vehicle electric power control system according to the present embodiment considers that when the third control device 300 according to the second embodiment described above selects a correction request from among a plurality of correction requests, it is determined whether a correction value indicated by the received correction request is within a predetermined range.

Specifically, a plurality of upper limit values and a plurality of lower limit values of the correction value of the correction request are provided. Since the correction request is used to control the output voltage of the DC-DC converter 30, the upper limit value is the maximum output voltage of the DC-DC converter 30 or the minimum value of the absolute maximum ratings of the components 501 to 503 connected to the DC-DC converter 30. Here, the maximum output voltage of the DC-DC converter 30 is set to be lower than the minimum value of the absolute maximum ratings of the components 501 to 503 so as not to exceed the absolute maximum ratings of the components 501 to 503.

Similarly to the upper limit value, since the correction request is used to control the output voltage of the DC-DC converter 30, the lower limit value is the minimum output voltage of the DC-DC converter 30 or the maximum value of the operation guarantee voltages of the components 501 to 503 connected to the DC-DC converter 30. Here, the minimum output voltage of the DC-DC converter 30 is set to be higher than the maximum value of the operation guarantee voltages of all the components 501 to 503 so as not to be lower than the operation guarantee voltages of all the components 501 to 503.

For example, in a case where the correction request is larger than the upper limit value, it is conceivable that the power supply voltage output from the DC-DC converter 30 and supplied to the low-voltage battery 50, the power distributor 70, the first control devices 100A to 100C, and the components 501 to 503 is significantly lowered. That is, the third control device 300 can determine that a failure has occurred at any part of the on-vehicle electric power control system.

In a case where the correction request is smaller than the lower limit value, the third control device 300 can determine that the correction value calculated by the first control devices 100A to 100C is abnormal, and can determine that a failure of the first control devices 100A to 100C has occurred.

That is, by comparing the correction value indicated by the correction request with the upper limit value and the lower limit value, the failure state in the on-vehicle electric power control system can be detected in a timely manner, and the reliability is improved.

FIG. 5A is a diagram illustrating a correction request aggregated by the third control device 300 according to the fifth embodiment. The third control device 300 receives a correction request indicating a correction value within a predetermined range from the first control device 100A and the first control device 100B. On the other hand, the third control device 300 receives a correction request outside the predetermined range from the first control device 100C. The correction value indicated by the correction request is a value below the maximum value of the operation guarantee voltages of all the components 501 to 503, and it can be seen that the correction request indicating the correction value calculated by the first control device 100C is abnormal. The third control device 300 functions as warning means that gives a warning as a precursor of failure in a case where the value indicated by the correction request is outside the predetermined range.

Hereinafter, the failure diagnosis processing of the present embodiment will be described with reference to FIG. 5B. FIG. 5B is a control flowchart of the third control device 300 according to the fifth embodiment.

Figure 5B:
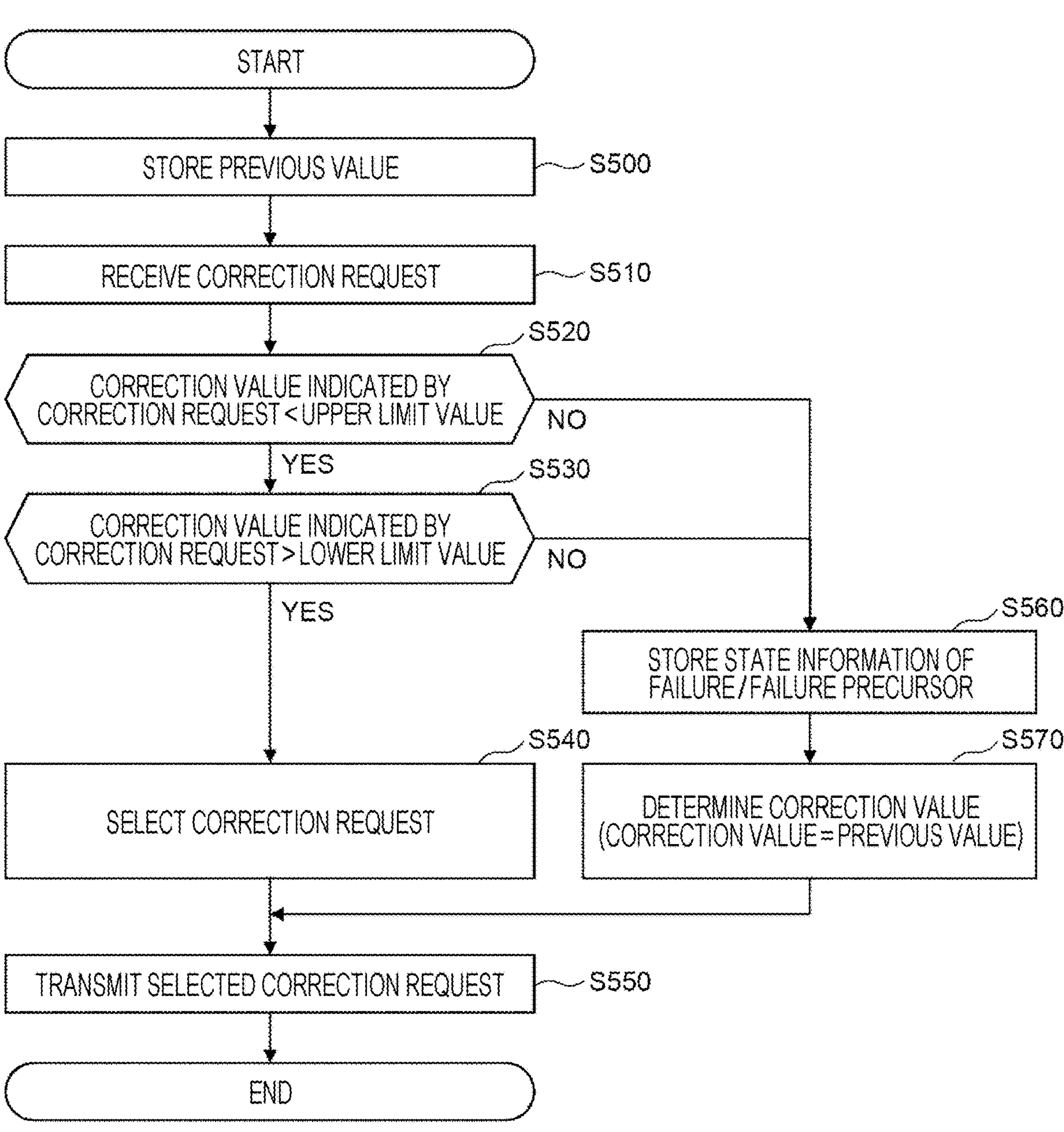
FIG. 5B is a control flowchart of the third control device 300 of the fifth embodiment.

The flowchart illustrated in FIG. 5B is executed at regular time intervals or variable time intervals after the start-up processing, the initialization processing, and the like of the third control device 300 are completed. The power supply voltage correction method executed by the first control devices 100A to 100C is similar to that of the first embodiment, and thus the description thereof will be omitted.

First, in step S500, the third control device 300 stores the correction value indicated by the correction request determined in the previous task in the memory. In the case of the first task, a preset setting value is stored.

Next, in step S510, the correction request receiving unit 305 of the third control device 300 receives the correction requests transmitted from the plurality of first control devices 100A to 100C.

In step S520, the third control device 300 determines whether the correction values indicated by the correction requests each received from the first control devices 100A to 100C exceed the upper limit value. In a case where the correction value indicated by the correction request does not exceed the upper limit value, the process proceeds to step S530, and in a case where the correction value indicated by the correction request exceeds the upper limit value, the process proceeds to step S560.

In step S530, the third control device 300 determines whether the correction values indicated by the correction requests each received from the first control devices 100A to 100C are less than the lower limit value. In a case where the correction value indicated by the correction request does not fall below the lower limit value, the process proceeds to step S540. In a case where the correction value indicated by the correction request falls below the lower limit value, the process proceeds to step S560.

The processing in step S540 is executed when the correction value indicated by the correction request is within the predetermined range. Specifically, in step S540, the third control device 300 selects the correction request having the largest correction value from among the plurality of correction requests.

Then, in step S550, the third control device 300 transmits the correction request selected in step S540 to the second control device 200.

On the other hand, step S560 is performed in a case where the correction value indicated by each correction request is not within the predetermined range. In step S560, the third control device 300 stores the state information of the failure state or the failure precursor state in the memory.

In step S570, the current task is in the normal state, that is, the correction value (previous value) of the previous task is determined as the correction value of the current task.

Effects of Fifth Embodiment

According to the fifth embodiment using the above-described method, by comparing the correction value indicated by the correction request with the upper and lower limit values, the failure state or the failure precursor state in the on-vehicle electric power control system can be detected in a timely manner, and the reliability is improved.

Sixth Embodiment

Figure 6A:
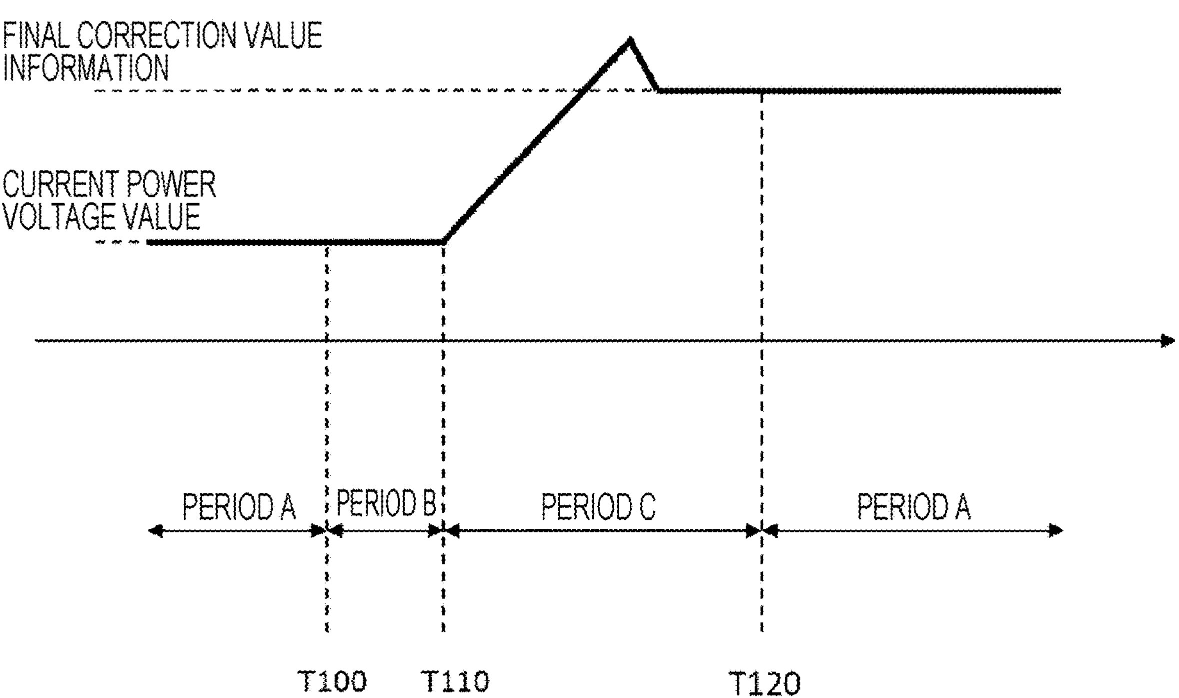
FIG. 6A is a time chart illustrating fluctuation in an output voltage of a DC-DC converter 30 of a sixth embodiment.
Figure 6B:
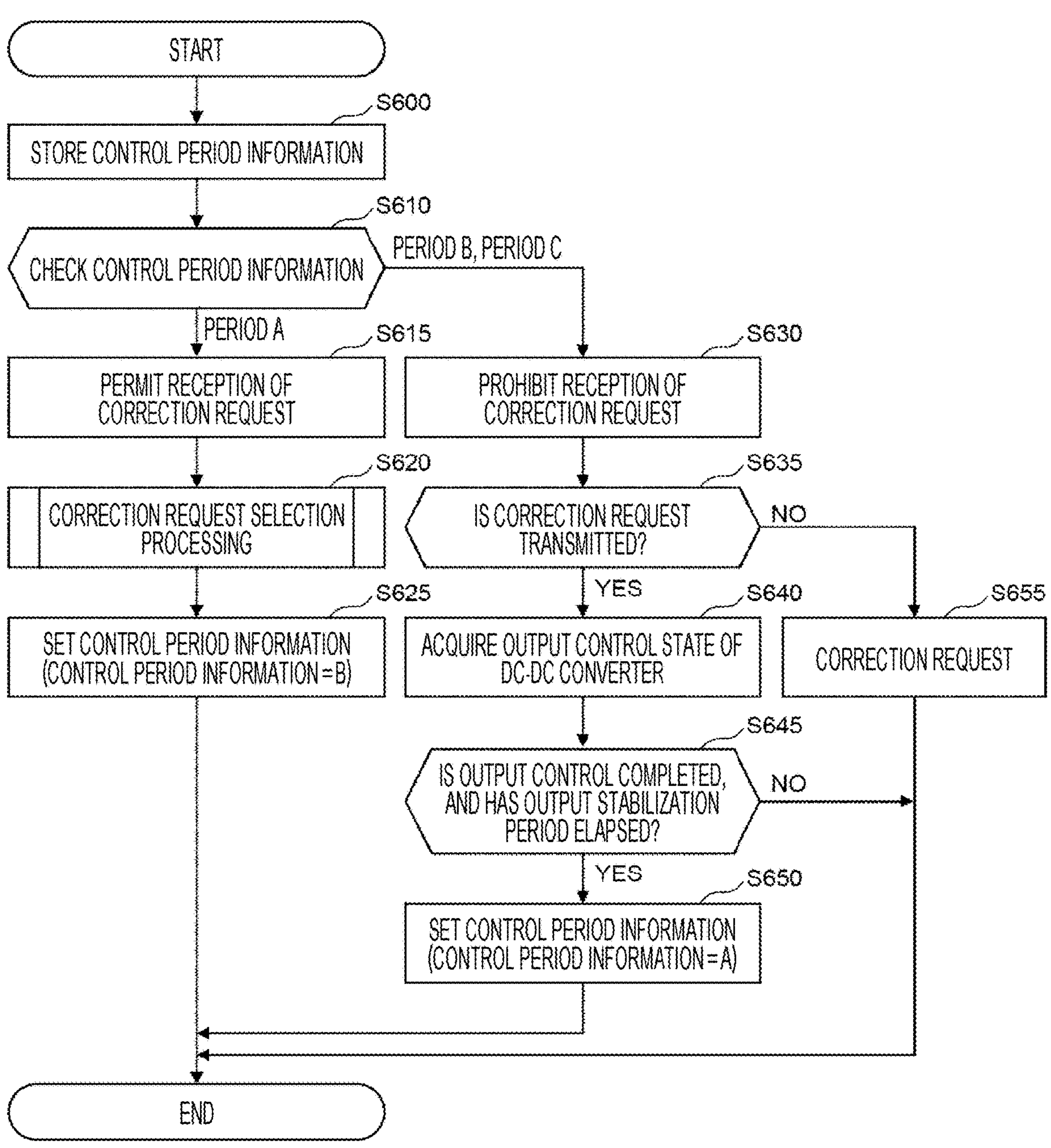
FIG. 6B is a control flowchart of a third control device 300 of the sixth embodiment.

Next, a sixth embodiment will be described with reference to FIGS. 6A and 6B. FIG. 6A is a time chart illustrating fluctuation in the output voltage of the DC-DC converter 30 according to the sixth embodiment.

The on-vehicle electric power control system of the present embodiment is different from that of the second embodiment in that a period in which the correction request can be received is set when the third control device 300 of the second embodiment aggregates the correction requests transmitted from the first control devices 100A to 100C.

Specifically, an instruction to change the output voltage is transmitted from the second control device 200 to the DC-DC converter 30, the DC-DC converter 30 changes the output voltage, and the output voltage is stabilized at the target power supply voltage. At this time, the third control device 300 does not receive the correction requests from the first control devices 100A to 100C, with a period from the timing when the change instruction is transmitted to the DC-DC converter 30 until the output voltage of the DC-DC converter 30 is settled as a mask period.

By setting the mask period described above, reception of a new correction request can be interrupted during the transient response period in which the DC-DC converter 30 changes the output voltage. As a result, the settling time of the output voltage of the DC-DC converter 30 can be shortened, and the stability of the DC-DC converter 30 can be improved.

FIG. 6A illustrates a period from reception of the correction request to the settling of the output voltage of the DC-DC converter 30, and repeats control in which the DC-DC converter 30 changes the output voltage according to the change instruction.

A control period A until time T100 indicates a period during which the third control device 300 receives the plurality of correction requests transmitted from the first control devices 100A to 100C.

A control period B from time T100 to time T110 indicates a period during which the third control device 300 suspends receiving the correction requests transmitted from the first control devices 100A to 100C. In the control period B, the third control device 300 selects a correction request, transmits a correction request to the second control device 200, and the second control device 200 transmits a change instruction to the DC-DC converter 30.

A control period C from time T110 to time T120 is a period required for settling the output voltage of the DC-DC converter 30, and indicates a period until the output voltage converges to the final correction value/is settled. Also in this control period C, the third control device 300 interrupts the reception of the correction requests transmitted from the first control devices 100A to 100C. That is, the control period B and the control period C are mask periods.

Hereinafter, the mask period setting processing of the present embodiment will be described with reference to FIG. 6B. FIG. 6B is a control flowchart of the third control device 300 according to the sixth embodiment. The flowchart illustrated in FIG. 6B is executed at regular time intervals or variable time intervals after the start-up processing, the initialization processing, and the like of the third control device 300 are completed. The power supply voltage correction method executed by the first control devices 100A to 100C is similar to that of the first embodiment, and thus the description thereof will be omitted.

First, in step S600, the third control device 300 stores the control period information in the aggregated control, and proceeds to step S610. The control period is switched to the control period A, the control period B, and the control period C by using, for example, a timer function mounted on the microcomputer and a control period determination processing to be described later.

In step S610, the third control device 300 checks the control period information, and proceeds to step S615 in the case of the control period A, and proceeds to step S630 in the case of the control period B or the control period C.

Next, in step S615, the third control device 300 sets permission for reception of the correction request, and proceeds to step S620.

In step S620, the third control device 300 executes correction request selection processing, and for example, the correction request aggregation function operation in the second embodiment described above is executed, and the process proceeds to step S625.

In step S625, the third control device 300 changes the control period information to the period B, and ends the task processing.

On the other hand, in step S630, the third control device 300 performs setting to prohibit reception of the correction request, and performs setting so as not to receive the correction requests transmitted from the first control devices 100A to 100C. After the setting, the process proceeds to step S635.

In step S635, the third control device 300 determines whether the correction request has been transmitted to the second control device 200. When the correction request has been transmitted, the third control device 300 proceeds to step S640, and when the correction request has not been transmitted, the third control device proceeds to step S655.

Next, in step S640, the third control device 300 acquires information on the output control state of the DC-DC converter 30. The information of the DC-DC converter 30 may be transmitted to the third control device 300 via the second control device 200, or may be directly transmitted from the DC-DC converter 30 to the third control device 300. Thereafter, the process proceeds to step S645.

In step S645, the third control device 300 checks the output control state of the DC-DC converter 30, and checks whether the output control is completed and the stabilization time of the output voltage has elapsed. When the output control is completed and the output stabilization time has elapsed, the process proceeds to step S650. In a case where the output control is not completed or the output stabilization time has not elapsed, the process does not proceed to step S650, and the task processing ends.

In step S650, the third control device 300 changes the control period information to the period A, and ends the task processing.

In step S655, the third control device 300 transmits a correction request to the second control device 200, and ends the task processing.

Effects of Sixth Embodiment

According to the sixth embodiment using the above-described method, reception of a new correction request can be interrupted during the transient response period in which the DC-DC converter 30 controls the increase or decrease of the output voltage, the settling time of the output voltage of the DC-DC converter 30 can be shortened, and the stability can be improved.

Seventh Embodiment

Figure 7B:
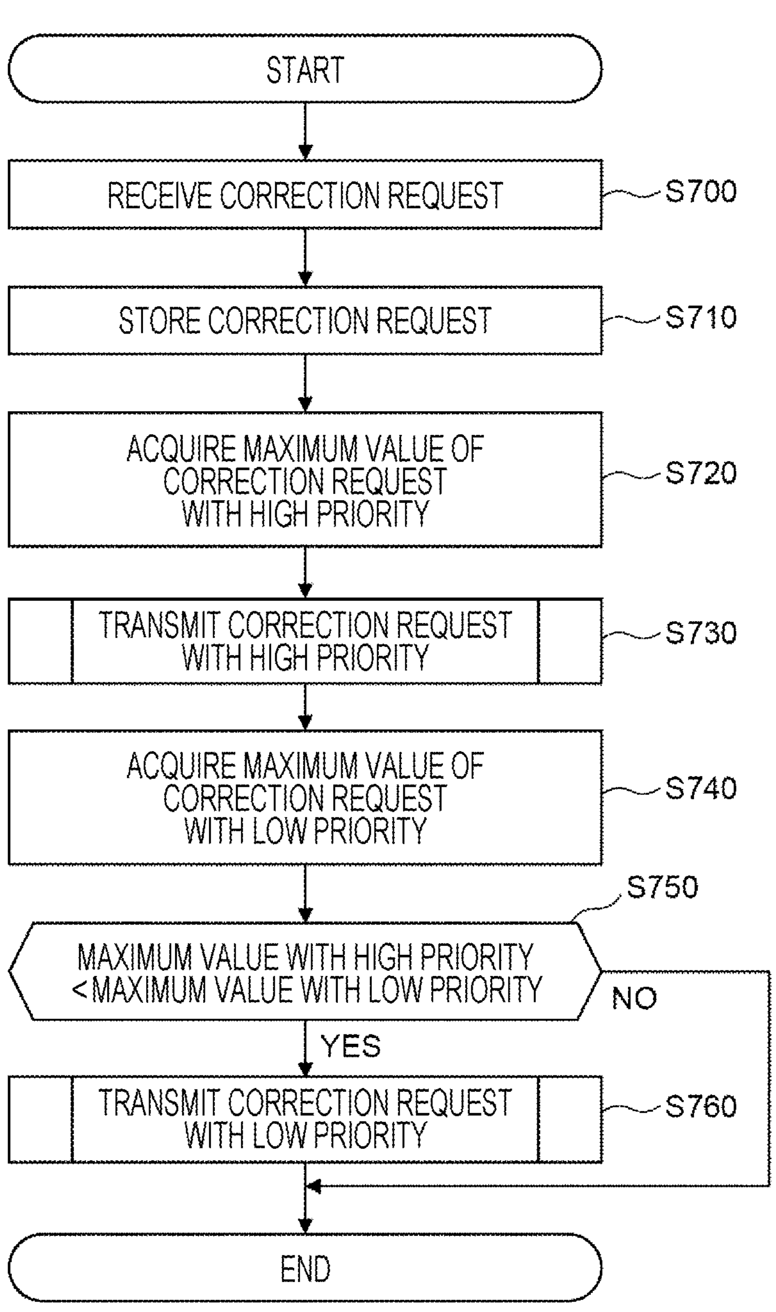
FIG. 7B is a control flowchart of the third control device 300 of the seventh embodiment.

Next, a seventh embodiment will be described with reference to FIGS. 7A to 7C. FIG. 7A is a diagram illustrating a correction request aggregated by the third control device 300 according to the seventh embodiment.

The on-vehicle electric power control system 2 of the present embodiment uses the information on a priority request and a general request of the correction requests transmitted from the first control devices 100A to 100C when the third control device 300 of the second embodiment described above selects a correction request from among the plurality of correction requests.

A plurality of components 501 to 503 are connected to the first control devices 100A to 100C, and each of the components 501 to 503 is classified into an important component (priority load) that is related to an external recognition function or the like related to driving, braking, steering, automatic driving, or the like of the vehicle and directly linked to basic performance of the vehicle, and a general component (general load) related to an audio, a power seat function, or the like. Regarding the power supply voltage supplied to each component, important components are prioritized.

Specifically, the correction requests transmitted from the first control devices 100A to 100C include a correction request with a high priority and a correction request with a low priority. In the function of receiving and aggregating the correction request of the third control device 300, the third control device 300 first aggregates the correction request having a high priority from among the received correction request having a high priority and the correction request having a low priority, selects a correction request from among the correction requests, and transmits the selected correction request to the second control device 200. Thereafter, the third control device 300 aggregates the correction requests with a low priority, selects a correction request from among the correction requests, and transmits the selected correction request to the second control device 200.

By using the function of aggregating the correction requests described above, it is possible to preferentially supply a power supply voltage corresponding to an important component, and it is possible to obtain operations and effects of maintaining and suppressing deterioration of vehicle basic performance.

As illustrated in FIG. 7A, a correction request with a high priority and a correction request with a low priority are transmitted from each of the three first control devices 100A to 100C. STEP0 indicates a current control voltage of the DC-DC converter 30, STEP1 indicates a correction value indicated by a correction request with a high priority indicating a highest correction value among the correction requests with a high priority, and STEP2 indicates a correction request with a low priority indicating a correction value with a highest priority among the correction requests with a low priority. In a case where the highest correction value of the correction request with a low priority is lower than the highest correction value of the correction request with a high priority, the correction request in STEP2 is not transmitted.

Detailed correction request aggregation operation according to the present embodiment will be described with reference to FIGS. 7B and 7C. FIG. 7B is a control flowchart of the third control device 300 according to the seventh embodiment. The flowchart illustrated in FIG. 7B is executed at regular time intervals or variable time intervals after the start-up processing, the initialization processing, and the like of the third control device 300 are completed. FIG. 7C is a diagram illustrating stored data of correction requests received by the third control device 300 of the seventh embodiment.

In step S700, the third control device 300 receives a plurality of correction requests transmitted from the first control devices 100A to 100C, and proceeds to step 710.

In step S710, the third control device 300 stores the received plurality of correction requests in the memory, and proceeds to step S720. As illustrated in FIG. 7C, the plurality of received correction requests are stored in the memory.

In step S720, the third control device 300 acquires the maximum value from among the stored correction requests with a high priority, and proceeds to step S730.

In step S730, the third control device 300 transmits the correction request with a high priority acquired in step S720 to the second control device 200. Then, the process proceeds to step S740.

Next, in step S740, the third control device 300 acquires the maximum value from among the stored correction requests with a low priority, and proceeds to step S750.

In step S750, the third control device 300 compares the maximum value of the correction request with a high priority acquired in step S720 with the maximum value of the correction request with a low priority acquired in step S740, and in a case where the maximum value of the correction request with a low priority is large, the process proceeds to step S760, and in a case where the maximum value of a high priority is large, this task processing is terminated without executing step S760.

In step S760, the third control device 300 transmits the correction request with a low priority acquired in step S740 to the second control device 200, and ends the task processing.

Effects of Seventh Embodiment

In the seventh embodiment, it is possible to preferentially supply a power supply voltage required by an important component directly linked to the basic performance of the vehicle. This makes it possible to construct a highly safe system that prioritizes the basic performance of the vehicle.

Modification

The present disclosure is not limited to the above-described embodiments, and includes various modifications. For example, the above-described embodiments have been described in detail for easy understanding of the present disclosure, and are not necessarily limited to those having all the described configurations. Further, a part of the configuration of one embodiment can be replaced with the configuration of another embodiment, and the configuration of another embodiment can be added to the configuration of one embodiment. In addition, it is possible to add, delete, and replace other configurations for a part of the configuration of each embodiment.

For example, the first control devices 100, 100A, 100B, and 100C of the above-described embodiments may be zone ECUs provided for each zone of the vehicle, may be domain ECUs provided for each function of the vehicle, or may be central ECUs that are communicably connected to each zone ECU and each domain ECU and integrally control each zone ECU.

REFERENCE SIGNS LIST

1, 2, 3, 4 on-vehicle electric power control system
10 high-voltage battery
20 first power supply line
30 DC-DC converter
40 second power supply line
50 low-voltage battery
51, 101, 102, 201, 301 signal line
60 third power supply line
70 power distributor
80 fourth power supply line
81 sixth power supply line
82 seventh power supply line
90 fifth power supply line
80-1, 80-2, 90-1, 90-2, 90-3 power supply line
100, 100A, 100B, 100C first control device
110 wiring resistance acquiring unit
120 current acquiring unit
130 voltage drop amount calculating unit
135 component information unit
140 correction value determining unit
150 correction request transmitting unit
160 correction request receiving unit
165 correction request aggregating unit
170 semiconductor switch
171 semiconductor switch
172 semiconductor switch
173 semiconductor switch group
180 microcomputer
200 second control device
210 correction request receiving unit
211 correction value instructing unit
300 third control device
305 correction request receiving unit
310 correction request aggregating unit
501, 502, 503 component
SW1, SW2, SW3, SW4 switch

The invention claimed is:

1. An on-vehicle electric power control system comprising:

a power supply device;

a control device connected to the power supply device via a first power supply line; and one or a plurality of loads connected to the control device via a second power supply line, wherein the control device includes:

wiring resistance acquiring means for acquiring wiring resistance values of the first power supply line and the second power supply line;

current acquiring means for acquiring a first current value supplied to the control device via the first power supply line and a second current value supplied to the load via the second power supply line;

voltage drop amount calculating means for calculating voltage drop amounts in the first power supply line and the second power supply line based on the wiring resistance value acquired by the wiring resistance acquiring means, the first current value acquired by the current acquiring means, and the second current value acquired by the current acquiring means;

correction value determining means for determining a correction value for correcting an output voltage of the power supply device based on the voltage drop amount calculated by the voltage drop amount calculating means; and correction request output means for outputting a correction request indicating the correction value determined by the correction value determining means.

2. The on-vehicle electric power control system according to claim 1, further comprising:

a power supply voltage control device that controls an output voltage of the power supply device, wherein the correction request output means outputs the correction request to the power supply voltage control device, and the power supply voltage control device controls an output voltage of the power supply device according to the correction request.

3. The on-vehicle electric power control system according to claim 1, wherein the voltage drop amount calculating means calculates the voltage drop amount based on a temperature estimation value of the first power supply line or the second power supply line.

4. The on-vehicle electric power control system according to claim 2, wherein a plurality of the control devices are provided for each zone of a vehicle, and each correction request output means of the plurality of control devices outputs the correction request for correcting an output voltage of the power supply device.

5. The on-vehicle electric power control system according to claim 4, further comprising:

an aggregated control device that receives a plurality of the correction requests output from the correction request output means of the plurality of control devices, wherein the aggregated control device outputs the correction request selected from among a plurality of the correction requests to the power supply voltage control device, and the power supply voltage control device controls an output voltage of the power supply device according to the selected correction request.

6. The on-vehicle electric power control system according to claim 5, wherein the aggregated control device selects the correction request indicating a highest voltage value from among a plurality of the correction requests.

7. The on-vehicle electric power control system according to claim 4, wherein one of the plurality of control devices receives one or a plurality of the correction requests output from the correction request output means of other one or a plurality of control devices, and the one control device outputs, to the power-supply voltage control device, the correction request selected from among the correction request output from the correction request output means of the one control device and the other one or plurality of correction requests output from the correction request output means of the other one or plurality of control devices, and the power supply voltage control device controls an output voltage of the power supply device according to the selected correction request.

8. The on-vehicle electric power control system according to claim 7, wherein the one control device selects the correction request indicating a highest voltage value from among the plurality of correction requests.

9. The on-vehicle electric power control system according to claim 4, wherein the plurality of control devices are connected by a ring topology.

10. The on-vehicle electric power control system according to claim 9, wherein the plurality of control devices connected by a ring topology output a first correction request indicating a correction value determined based on a voltage drop amount in a first power supply voltage supply path and a second correction request indicating a correction value determined based on a voltage drop amount in a second power supply voltage supply path different from the first power supply voltage supply path.

11. The on-vehicle electric power control system according to claim 1, further comprising:

warning means for giving a warning as a precursor of a failure in a case where a value indicated by the correction request is out of a predetermined range.

12. The on-vehicle electric power control system according to claim 11, wherein an upper limit value of the predetermined range is a minimum value of absolute maximum ratings of the one or plurality of loads, and a lower limit value of the predetermined range is a maximum value of minimum operation guarantee voltages of the one or plurality of loads.

13. The on-vehicle electric power control system according to claim 2, wherein the power supply voltage control device masks a new correction request after receiving the correction request until an output voltage of the power supply device according to the correction request is stabilized.

14. The on-vehicle electric power control system according to claim 1, wherein the load includes a priority load related to basic performance of a vehicle, and the correction value determining means determines the correction value based on the voltage drop amount and an operation guarantee voltage of the priority load.

15. A control device of an on-vehicle electric power control system connected to a power supply device via a first power supply line and connected to one or a plurality of loads via a second power supply line, the control device comprising:

wiring resistance acquiring means for acquiring wiring resistance values of the first power supply line and the second power supply line;

current acquiring means for acquiring a first current supplied to the control device via the first power supply line and a second current supplied to the load via the second power supply line;

voltage drop amount calculating means for calculating voltage drop amounts in the first power supply line and the second power supply line based on the wiring resistance value acquired by the wiring resistance acquiring means, the first current acquired by the current acquiring means, and the second current acquired by the current acquiring means;

correction value determining means for determining a correction value for correcting an output voltage of the power supply device based on the voltage drop amount calculated by the voltage drop amount calculating means; and correction request output means for outputting a correction request indicating the correction value determined by the correction value determining means.

16. An aggregated control device communicably connected to a plurality of control devices according to claim 15, wherein the correction request selected from among the plurality of correction requests output from the correction request output means of the plurality of control devices is output to a power supply voltage control device that controls an output voltage of the power supply device.

* * * * *